United States Patent
Khurana

(10) Patent No.: US 12,528,184 B2
(45) Date of Patent: Jan. 20, 2026

(54) ROBOTIC SYSTEMS AND METHODS FOR MITIGATING UNDESIRED ORIENTATIONAL MOTION OF KINEMATIC COMPONENTS

(71) Applicant: MAKO Surgical Corp., Weston, FL (US)

(72) Inventor: Rishabh Khurana, Fort Lauderdale, FL (US)

(73) Assignee: MAKO Surgical Corp., Weston, FL (US)

(*) Notice: Subject to any disclaimer, the term of this patent is extended or adjusted under 35 U.S.C. 154(b) by 264 days.

(21) Appl. No.: 18/213,312

(22) Filed: Jun. 23, 2023

(65) Prior Publication Data
US 2023/0330851 A1 Oct. 19, 2023

Related U.S. Application Data

(63) Continuation of application No. PCT/US2021/065334, filed on Dec. 28, 2021.
(Continued)

(51) Int. Cl.
*A61B 34/30* (2016.01)
*A61B 34/00* (2016.01)
(Continued)

(52) U.S. Cl.
CPC .............. *B25J 9/1643* (2013.01); *A61B 34/30* (2016.02); *A61B 34/77* (2016.02); *A61B 18/12* (2013.01)

(58) Field of Classification Search
CPC ....... B25J 9/1641; B25J 9/1643; A61B 34/32; A61B 34/77; A61B 34/30; A61B 34/74; A61B 2034/2059; A61B 2034/107; A61B 18/12; A61B 2090/067; A61B 2034/105; A61B 2034/104
See application file for complete search history.

(56) References Cited

U.S. PATENT DOCUMENTS 6,424,885 B1 * 7/2002 Niemeyer .............. A61B 34/77
600/109
7,831,292 B2 11/2010 Quaid et al.
(Continued)

FOREIGN PATENT DOCUMENTS

| EP | 3620121 A1 | 3/2020 |
| JP | 2019034352 A | 3/2019 |
| WO | 2021067597 A1 | 4/2021 |

OTHER PUBLICATIONS

Partial International Search Report for Application No. PCT/US2021/065334 dated Apr. 8, 2022, 2 pages.
(Continued)

*Primary Examiner* — Stephen Holwerda
(74) *Attorney, Agent, or Firm* — Howard & Howard Attorneys PLLC

(57) ABSTRACT

A robotic surgical system includes a kinematic chain defined by components of a manipulator and a surgical tool including an energy applicator. At least one controller identifies that one or more components of the kinematic chain other than the energy applicator is either experiencing or will experience an undesired orientational motion. The at least one controller changes operation of the manipulator to mitigate for the present or expected undesired orientational motion.

25 Claims, 13 Drawing Sheets

Related U.S. Application Data

(60) Provisional application No. 63/132,821, filed on Dec. 31, 2020.

(51) Int. Cl.
*B25J 9/16* (2006.01)
*A61B 18/12* (2006.01)

(56) References Cited

U.S. PATENT DOCUMENTS

| | | | |
|---|---|---|---|
| 8,010,180 | B2 | 8/2011 | Quaid et al. |
| 8,348,861 | B2 | 1/2013 | Glozman et al. |
| 9,008,757 | B2 | 4/2015 | Wu |
| 9,084,613 | B2 | 7/2015 | Qutub |
| 9,119,655 | B2 | 9/2015 | Bowling et al. |
| 9,566,125 | B2 | 2/2017 | Bowling et al. |
| 9,707,043 | B2 | 7/2017 | Bozung |
| 9,937,014 | B2 | 4/2018 | Bowling et al. |
| 10,065,311 | B1* | 9/2018 | Buschmann ............ B25J 9/1664 |
| 10,314,661 | B2 | 6/2019 | Bowling et al. |
| 10,327,849 | B2 | 6/2019 | Post |
| 2007/0013336 | A1 | 1/2007 | Nowlin et al. |
| 2007/0085496 | A1 | 4/2007 | Philipp et al. |
| 2009/0000626 | A1* | 1/2009 | Quaid ................. A61B 17/1695 128/898 |
| 2011/0218673 | A1* | 9/2011 | Oga ..................... G05B 19/416 700/254 |
| 2011/0295268 | A1 | 12/2011 | Roelle et al. |
| 2011/0306985 | A1 | 12/2011 | Inoue et al. |
| 2012/0330429 | A1 | 12/2012 | Axelson, Jr. et al. |
| 2013/0096574 | A1 | 4/2013 | Kang et al. |
| 2014/0031838 | A1* | 1/2014 | Namiki .................. A61B 34/37 606/130 |
| 2014/0039517 | A1* | 2/2014 | Bowling ................ A61B 34/32 606/130 |
| 2014/0222207 | A1 | 8/2014 | Bowling et al. |
| 2014/0276949 | A1 | 9/2014 | Staunton et al. |
| 2016/0052141 | A1* | 2/2016 | Ide ........................ B25J 13/088 901/46 |
| 2016/0296296 | A1 | 10/2016 | Bowling et al. |
| 2017/0043481 | A1* | 2/2017 | Hannya ................. B25J 9/1641 |
| 2017/0120449 | A1* | 5/2017 | Matsunami ............ B25J 9/1676 |
| 2017/0252116 | A1* | 9/2017 | Ogawa .................. A61B 34/30 |
| 2018/0021094 | A1* | 1/2018 | Matsuda ................ A61B 34/30 600/102 |
| 2018/0168750 | A1* | 6/2018 | Staunton ................ A61B 34/20 |
| 2018/0353253 | A1 | 12/2018 | Bowling |
| 2019/0142520 | A1 | 5/2019 | VanDyken |
| 2020/0170724 | A1 | 6/2020 | Flatt et al. |
| 2020/0289133 | A1 | 9/2020 | Elbanna et al. |

OTHER PUBLICATIONS

International Search Report for Application No. PCT/US2021/065334 dated May 31, 2022, 3 pages.

English language abstract and machine-assisted English translation for JP 2019-034352 A extracted from espacenet.com database on Jul. 15, 2025, 25 pages.

* cited by examiner

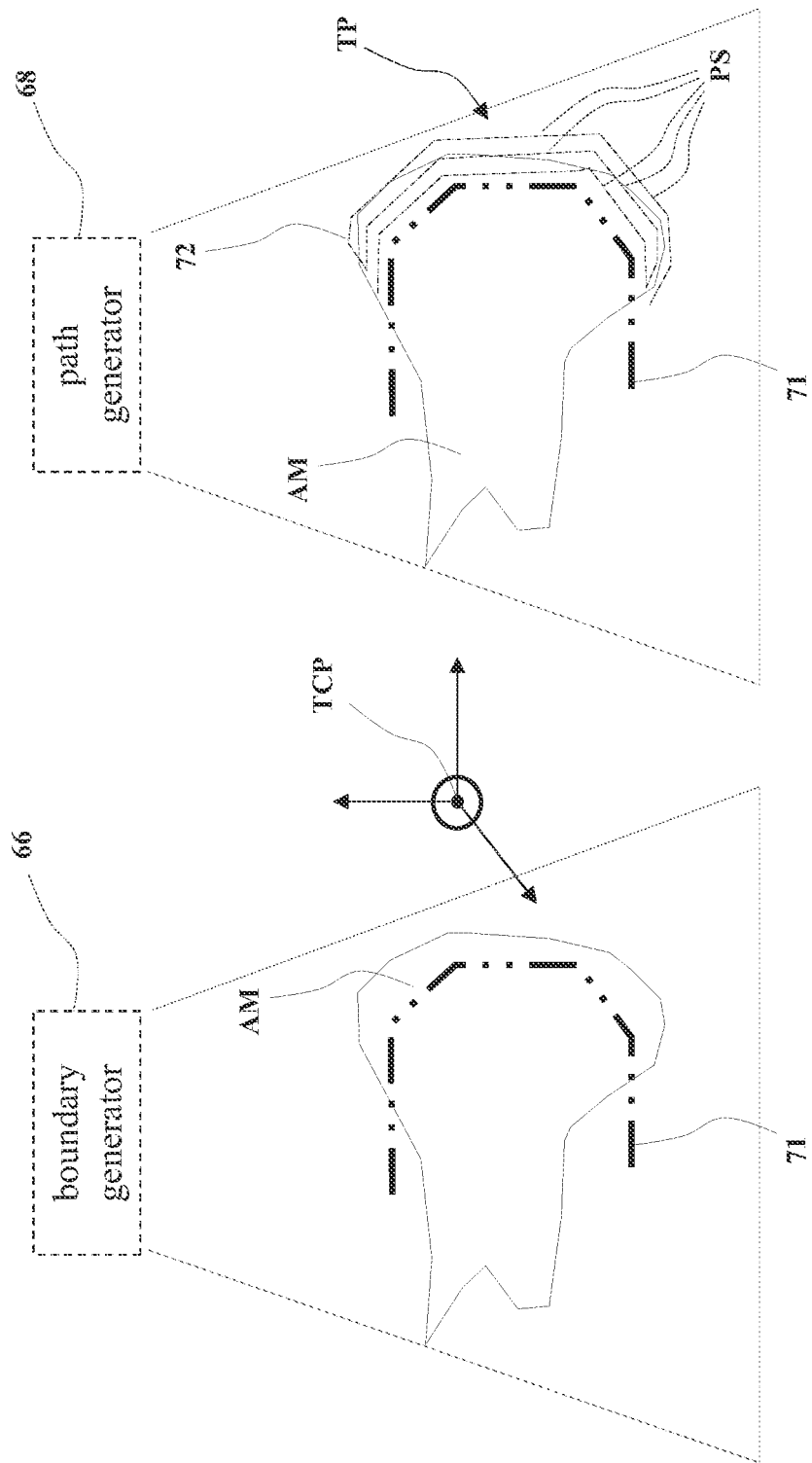

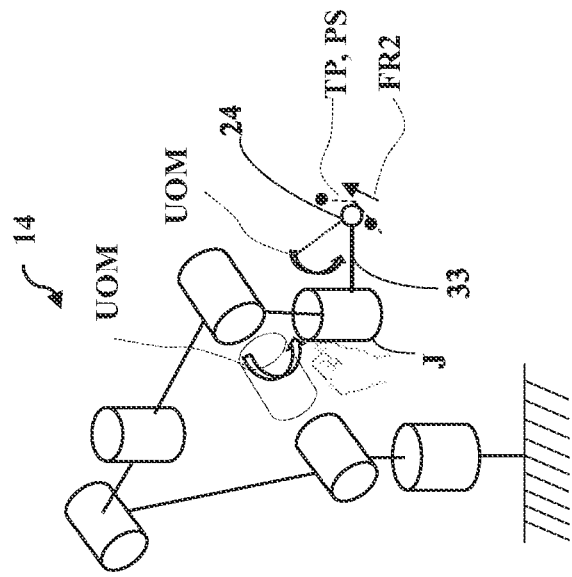
FIG. 18
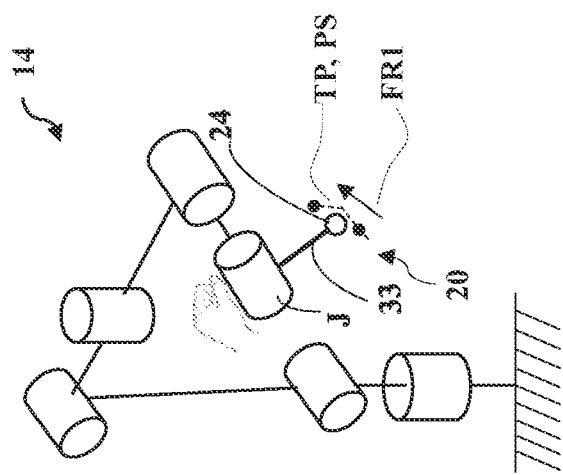
FIG. 17
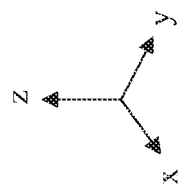

ROBOTIC SYSTEMS AND METHODS FOR MITIGATING UNDESIRED ORIENTATIONAL MOTION OF KINEMATIC COMPONENTS

CROSS-REFERENCE TO RELATED APPLICATIONS

The subject application is a United States bypass continuation of International Patent App. No. PCT/US2021/065334, filed on Dec. 28, 2021, which claims priority to and all the benefits of U.S. Provisional Patent App. No. 63/132,821, filed Dec. 31, 2020, the contents of each of the aforementioned applications being hereby incorporated by reference in their entirety.

TECHNICAL FIELD

The present disclosure relates generally to robotic systems and methods for controlling account for undesired orientational movement of components in the kinematic chain of the robot.

BACKGROUND

Robotic systems that perform surgical procedures at surgical sites often include a manipulator with a base, a plurality of links and joints, and an end effector coupled to the manipulator. Many times, the end effector comprises or supports a surgical tool with an energy applicator designed to remove tissue at the surgical site. A kinematic chain is defined by the base, links and joints, and surgical tool including the energy applicator.

For admittance-controlled robotic systems, forces are received as input and commanded positions of the energy applicator are outputted. Due to the inverse-kinematic nature of admittance control, the commanded positions of the energy applicator are outputted as task space (x, y, z) coordinates and the respective pose (position and orientation) of the kinematic chain components are outputted according to a solution satisfying constraints defined by a complex system of equations.

The energy applicator is typically moved along a tool path according to the commanded positions. The velocity at which the energy applicator moves along the tool path is commonly known as a "feed rate" of the energy applicator. Prior systems have contemplated to adjust the feed rate to account for conditions or inputs, such as manual user selection of the feed rate, characteristics of the tissue, sensed forces applied to the energy applicator, curvature of the path, and the like. Adjustment of the feed rate in the prior admittance-controlled robotic systems are responsive only to desired (or intended) inputs or conditions that directly affect the energy applicator's movement along the tool path. However, prior techniques for adjustment of the feed rate do not account for the possibility of undesired orientational motion occurring for components of the kinematic chain other than the energy applicator (i.e., non-tool path components) such as the tool shaft, joints, or links of the manipulator. Such non-tool path components may experience abrupt angular velocity, angular acceleration or angular jerk occurring when such non-tool path components are kinematically manipulated according to the complex inverse kinematic solution. Such undesired orientational motion of non-tool path components may cause inaccuracies in the commanded position. For example, inertia of the non-tool path components may cause inadvertent changes to motion or direction causing deviations from the commanded position. Furthermore, such undesired orientational motion may disrupt the surgical workflow or user experience because an operator may be alarmed by such motion and may want to manually slow down or stop the operation. There remains a need to address at least the aforementioned disadvantages.

SUMMARY

According to a first aspect, a surgical system is provided, which includes a surgical tool including an energy applicator; a manipulator comprising a base and a plurality of links and joints and the manipulator being configured to support the surgical tool, and wherein a kinematic chain is defined by components of the manipulator and the surgical tool including the energy applicator; and at least one controller configured to: identify that one or more components of the kinematic chain other than the energy applicator is either experiencing or will experience an undesired orientational motion; and change a feed rate of the energy applicator to account for the undesired orientational motion.

According to a second aspect, a method of operating the surgical system according to the first aspect is provided.

According to a third aspect, a surgical system is provided, which includes a surgical tool including an energy applicator; a manipulator comprising a base and a plurality of links and joints and the manipulator being configured to support the surgical tool, and wherein a kinematic chain is defined by components of the manipulator and the surgical tool including the energy applicator; and at least one controller configured to: identify that one or more components of the kinematic chain other than the energy applicator is either experiencing or will experience an undesired orientational motion; and modify operation of the manipulator to account for the undesired orientational motion.

According to a fourth aspect, a method of operating the surgical system according to the third aspect is provided.

According to a fifth aspect, a surgical system is provided, which includes a surgical tool including an energy applicator; a manipulator comprising a base and a plurality of links and joints and the manipulator being configured to support the surgical tool, and wherein a kinematic chain is defined by components of the manipulator and the surgical tool including the energy applicator; and at least one controller configured to: determine a feed rate defined as a velocity at which the energy applicator advances; control the manipulator to advance the energy applicator to a plurality of commanded positions according to the feed rate; identify that one or more components of the kinematic chain other than the energy applicator is either experiencing or will experience an undesired orientational motion that occurs during advancement of the energy applicator according to the feed rate; and change the feed rate to account for the undesired orientational motion.

According to a sixth aspect, a method of operating the surgical system according to the fourth aspect is provided.

According to a seventh aspect, a surgical system is provided comprising: a surgical tool including an energy applicator; a manipulator comprising a base and a plurality of links and joints and being configured to support the surgical tool, and wherein a kinematic chain is defined by components comprising the base and plurality of links and joints of the manipulator and the surgical tool including the energy applicator; and at least one controller configured to: determine a feed rate defined as a velocity at which the energy applicator advances along a tool path in a semi-autonomous mode; control the manipulator in the semi-autonomous mode to advance the energy applicator to a plurality of commanded positions along the tool path according to the feed rate; identify that one or more components of the kinematic chain other than the energy applicator is either experiencing or will experience an undesired orientational motion that occurs during advancement of the energy applicator along the tool path according to the feed rate; and change the feed rate to account for the undesired orientational motion.

According to an eighth aspect, a method of operating the surgical system according to the seventh aspect is provided.

According to a ninth aspect, a surgical system with at least one controller is provided with a non-transitory computer readable medium having stored thereon simulation data indicative of an undesired orientational motion of the one or more components of the kinematic chain, wherein the simulation data is obtained from a simulation configured to simulate control of the manipulator to advance the energy applicator to the plurality of commanded positions, and wherein the at least one controller is configured to: retrieve the simulation data from the non-transitory computer readable medium; identify, based on the simulation data, that one or more components of the kinematic chain other than the energy applicator is either experiencing or will experience the undesired orientational motion; and modify operation of the manipulator to account for the undesired orientational motion.

According to a tenth aspect, a method of operating the surgical system according to the ninth aspect is provided.

According to an eleventh aspect, a surgical system is provided comprising: a surgical tool including a shaft and an energy applicator at a distal end of the shaft; a manipulator comprising a base and a plurality of links and joints and the manipulator being configured to support the surgical tool; at least one controller configured to: associate one or more virtual haptic objects relative to the shaft of the surgical tool at locations on the shaft; associate a virtual boundary relative to a surgical site with which the surgical tool interacts; detect a collision between the one or more virtual haptic objects associated with the shaft and the virtual boundary associated with the surgical site; control the manipulator to constrain the shaft from exceeding the virtual boundary in response to detection of the collision.

According to a twelfth aspect, a method of operating the surgical system according to the eleventh aspect is provided.

Any of the above aspects can be combined in part or in whole.

For any of the above aspects, any one or more of the following implementations are contemplated, individually or in combination:

In some implementations, the at least one controller is configured to determine a feed rate defined as a velocity at which the energy applicator advances.

In some implementations, the at least one controller is configured to control the manipulator to advance the energy applicator to a plurality of commanded positions according to the feed rate.

In some implementations, the undesired orientational motion occurs during advancement of the energy applicator according to the feed rate.

In some implementations, the manipulator comprises a plurality of links and joints, which are part of the kinematic chain.

In some implementations, the feed rate is for advancing the energy applicator specifically according to commanded positions along a tool path.

In some implementations, the feed rate is for advancing the energy applicator specifically in a semi-autonomous mode of operation.

In some implementations, the at least one controller changes the feed rate to account for the undesired orientational motion by further being configured to reduce the feed rate by a factor correlated to a magnitude of the undesired orientational motion experienced by or that will be experienced by the one or more components of the kinematic chain other than the energy applicator. In some implementations, the changed feed rate is a non-zero velocity that is less than the velocity of the feed rate existing before change of the feed rate.

In some implementations, the at least one controller identifies that one or more components of the kinematic chain other than the energy applicator is either experiencing or will experience the undesired orientational motion by further being configured to: compare the undesired orientational motion to a threshold or range; and change the feed rate to account for the undesired orientational motion in response to the undesired orientational motion satisfying the threshold or range.

In some implementations, the at least one controller is configured to: obtain forward kinematic measurements of the kinematic chain during advancement of the energy applicator to the plurality of commanded positions along the tool path according to the feed rate; and evaluate the forward kinematic measurements to identify that one or more components of the kinematic chain other than the energy applicator is either experiencing or will experience the undesired orientational motion.

In some implementations, a non-transitory computer readable medium has stored thereon simulation data indicative of the undesired orientational motion of the one or more components of the kinematic chain, wherein the simulation data is obtained from a pre-operative simulation configured to simulate control of the manipulator in the semi-autonomous mode to advance the energy applicator to the plurality of commanded positions along the tool path according to the feed rate. In some implementations, the at least one controller is configured to: retrieve the simulation data from the non-transitory computer readable medium; and identify, based on the simulation data, that one or more components of the kinematic chain other than the energy applicator is either experiencing or will experience the undesired orientational motion.

In some implementations, one or more sensors is configured to generate measurements related to any one or more components of the kinematic chain. In some implementations, the one or more sensors comprise any one or more of the following: sensors coupled to any one or more of the joints and being configured to sense any one or more of a: joint position, joint velocity, and joint acceleration; current sensors configured to sense electrical current drawn by actuators of any one or more of the joints; a navigation system configured to detect a state of a tracker coupled to any one or more components of the kinematic chain; and a vision system configured to detect motion of any one or more components of the kinematic chain. In some implementations, the at least one controller is configured to analyze the measurements to identify that one or more components of the kinematic chain other than the energy applicator is either experiencing or will experience the undesired orientational motion.

In some implementations, the at least one controller is configured to: store, in a non-transitory computer readable medium, inertia values for any one or more components of the kinematic chain; and in some implementations, utilize the stored inertia values to identify that one or more components of the kinematic chain other than the energy applicator is either experiencing or will experience the undesired orientational motion. In one implementation, the inertia values are rotational inertia values. In one implementation, the inertia values are translational or linear inertia values.

In some implementations, during advancement of the energy applicator along the tool path in the semi-autonomous mode, the at least one controller is further configured to: enable reorientation of the surgical tool; identify that the one or more components of the kinematic chain other than the energy applicator is either experiencing or will experience the undesired orientational motion that further occurs responsive to reorientation of the surgical tool; and change the feed rate to account for the undesired orientational motion that further occurs responsive to reorientation of the surgical tool. In some implementations, the reorientation is initiated by a user. In other implementations, the reorientation is automated by the system.

In some implementations, the at least one controller is configured to: associate one or more virtual haptic objects relative to the one or more components of the kinematic chain; define a virtual boundary; detect a collision between the one or more virtual haptic objects and the virtual boundary; control the manipulator to constrain the one or more components of the kinematic chain having the virtual haptic object associated therewith from exceeding the virtual boundary in response to detection of the collision; identify that the one or more components of the kinematic chain other than the energy applicator is either experiencing or will experience the undesired orientational motion that further occurs responsive to constraint of the one or more components of the kinematic chain in response to the detection of the collision; and change the feed rate to account for the undesired orientational motion that further occurs responsive to constraint the one or more components of the kinematic chain in response to the detection of the collision.

In some implementations, the surgical tool comprises a shaft and the energy applicator at a distal end of the shaft, and the at least one controller is configured to: associate one or more of the virtual haptic objects relative to the shaft of the surgical tool at locations on the shaft other than at the distal end; associate the virtual boundary relative to a surgical site with which the surgical tool interacts; control the manipulator to constrain the shaft from exceeding the virtual boundary in response to detection of the collision between the one or more virtual haptic objects of the shaft and the virtual boundary of the surgical site; identify that the shaft is either experiencing or will experience the undesired orientational motion; and change the feed rate to account for the undesired orientational motion experienced by or that will be experienced by the shaft.

In some implementations, the at least one controller is configured to identify that the shaft is either experiencing or will experience the undesired orientational motion by further being configured to evaluate penetration that occurs between the one or more virtual haptic objects of the shaft and the virtual boundary of the surgical site. In some implementations, a value/magnitude of the penetration that occurs between the one or more virtual haptic objects and the virtual boundary can be evaluated and the feed rate can be adjusted in response to this evaluation.

In some implementations, in response to change of the feed rate to account for the undesired orientational motion, the at least one controller is configured to: identify that the one or more components of the kinematic chain other than the energy applicator is no longer experiencing or will no longer experience the undesired orientational motion, and in response, restore or resume the feed rate existing before or planned after change of the feed rate.

In some implementations, the undesired orientational motion is further defined as undesired one or more of an: angular velocity, angular acceleration, or angular jerk experienced by or that will be experienced by any one or more components of the kinematic chain other than the energy applicator.

In some implementations, the surgical instrument comprises a shaft and the energy applicator at a distal end of the shaft, wherein the energy applicator is further defined as a cutting bur.

In some implementations, the at least one controller is configured to: model the surgical instrument and the energy applicator as a virtual rigid body; and change the instrument feed rate to account for the undesired orientational motion based on a virtual force applied to the virtual rigid body.

In some implementations, the at least one controller is configured to: calculate the feed rate based on a plurality of variables, the variables including one or more of: a shape of a space to which the energy applicator is applied; a type of energy applicator; patient health; nature of tissue to which the energy applicator is applied; and geometry of a path segment of the tool path.

In some implementations, in addition to changing the feed rate to account for the undesired orientational motion, the at least one controller is further configured to adjust the determined instrument feed rate based on any one or more of: user adjustment of the instrument feed rate; forces and torques to which the energy applicator is exposed; curvature of a path segment of the tool path; instrument power; tissue temperature; and movement of or external force applied to the patient or an anatomy tracker.

In some implementations, during changing of the feed rate, the energy applicator is advancing along on a segment of the tool path that is a linear, and not curved.

In some implementations, the one or more controllers mitigate undesired orientational motion by changing behavior of the manipulator in a manner that is addition to, or alternative to, changing the feed rate FR. In some implementations, the one or more controllers can predictively or dynamically manipulate joint motion, joint limits, or joint poses, e.g., within the null-space; change the trajectory of the tool; modify the tool path; adjust virtual boundaries or other constraints; prohibit robotic functions, such as reorientation, backdrive, or feed rate adjustment by the user, or the like.

Any of the above implementations can be utilized individually or in combination with any part of any of the above aspects.

DESCRIPTION OF THE DRAWINGS

Advantages of the present disclosure will be readily appreciated as the same becomes better understood by reference to the following detailed description when considered in connection with the accompanying drawings.

FIG. 6 illustrates an example output of a boundary generator of the software program, according to one implementation.

FIG. 7 illustrates an example output of a path generator of the software program, according to one implementation.

FIG. 17 schematically illustrates an example of reorientation of the manipulator as the energy applicator advances along the tool path according to a feed rate.

FIG. 18 schematically illustrates an undesired orientational motion experienced by certain non-tool path components of the kinematic chain of FIG. 17 responsive to the reorientation and reduction of the feed rate to mitigate the undesired orientational motion, according to one implementation.

DETAILED DESCRIPTION

I. System Overview

Figure 1:
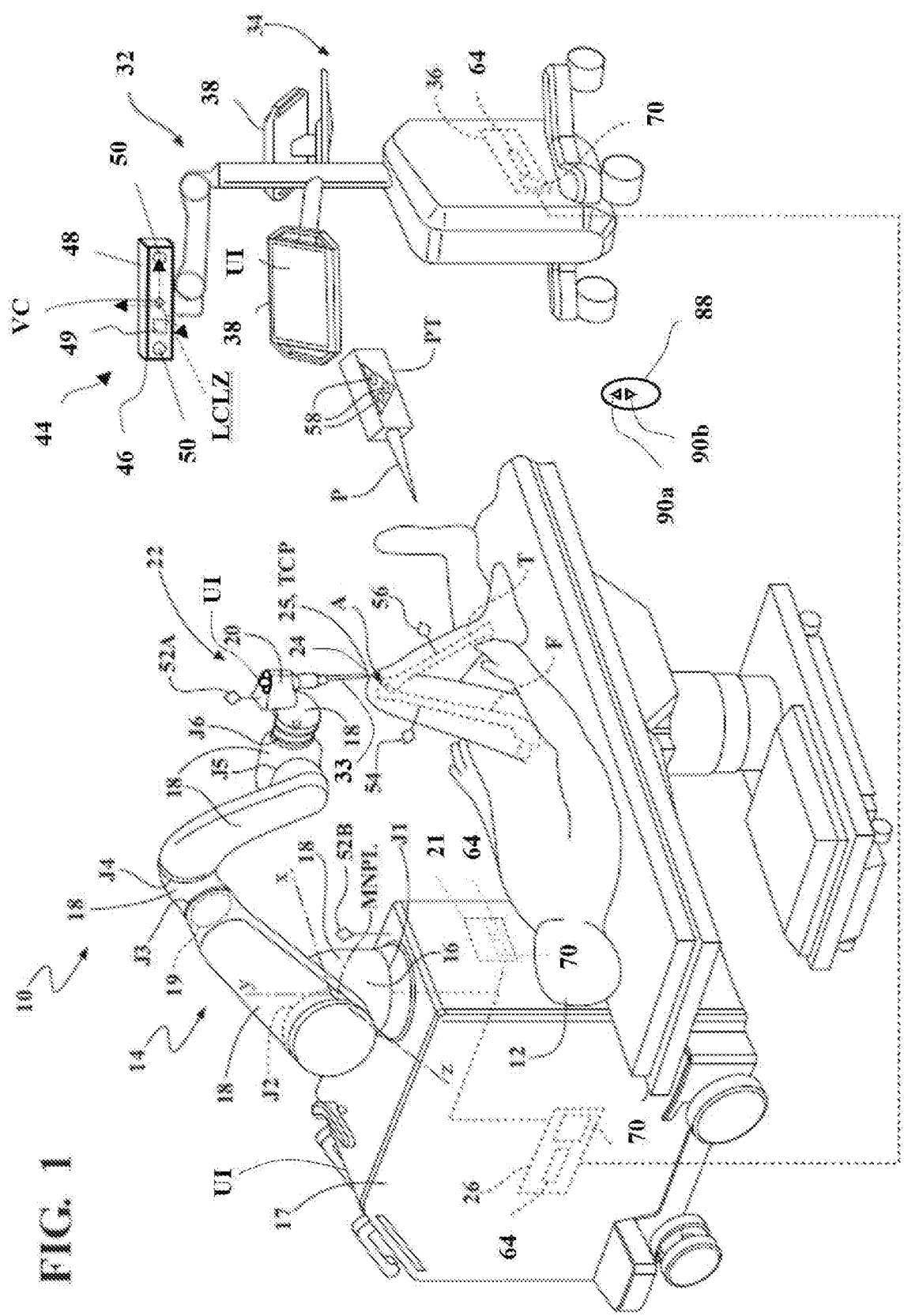
FIG. 1 is a perspective view of one implementation of a robotic surgical system.

Referring to FIG. 1, a robotic surgical system 10 is illustrated. The system 10 is useful for treating a surgical site or anatomical volume (A) of a patient 12, such as treating bone or soft tissue. In FIG. 1, the patient 12 is undergoing a surgical procedure. The anatomy in FIG. 1 includes a femur F and a tibia T of the patient 12. The surgical procedure may involve tissue removal or other forms of treatment. Treatment may include cutting, coagulating, lesioning the tissue, other in-situ tissue treatments, or the like. In some examples, the surgical procedure involves partial or total knee or hip replacement surgery, shoulder replacement surgery, spine surgery, or ankle surgery. In some examples, the system 10 is designed to cut away material to be replaced by surgical implants, such as hip and knee implants, including unicompartmental, bicompartmental, multicompartmental, or total knee implants. Some of these types of implants are shown in U.S. Patent Application Publication No. 2012/0330429, entitled, "Prosthetic Implant and Method of Implantation," the disclosure of which is hereby incorporated by reference. The system 10 and techniques disclosed herein may be used to perform other procedures, surgical or non-surgical, or may be used in industrial applications or other applications where robotic systems are utilized.

Figure 3:
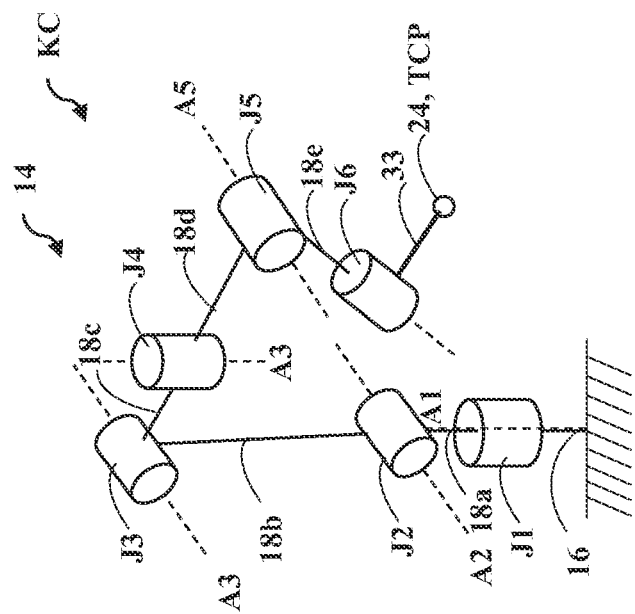
FIG. 3 is a schematic illustration of one implementation of a kinematic chain formed by components of the manipulator including the tool and its energy applicator.
Figure 2:
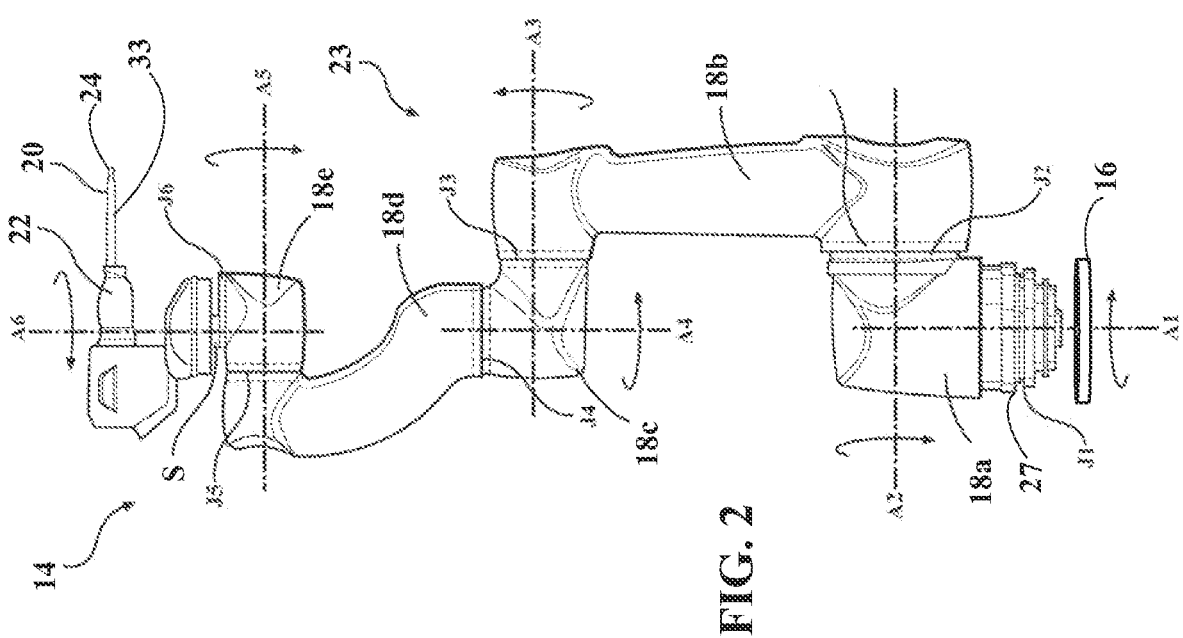
FIG. 2 is a layout of one implementation of a manipulator of the robotic surgical system showing respective links, joints and an end effector and tool coupled thereto.

As shown in FIGS. 1-3, the system 10 includes a manipulator 14. A manipulator cart 17 (as shown in FIG. 1) can support the manipulator 14 such that the manipulator 14 is fixed to the manipulator cart 17. The manipulator 14 has a base 16 and plurality of links 18a-18n. In one example, pairs of adjacent links 18 are connected by one of the joints J. The links 18 collectively form one or more arm(s) 23 of the manipulator 14. The manipulator 14 may have a serial arm configuration (as shown in FIGS. 1-3), a parallel arm configuration, or any other suitable manipulator configuration. In other examples, more than one manipulator 14 may be utilized in a multiple arm configuration. The manipulator 14 according to one example has six joints J1-J6 implementing at least six-degrees of freedom (DOF) for the manipulator 14. The manipulator 14 may have any number of degrees of freedom and may have any suitable number of joints J and may have redundant joints.

At each joint J, there may be an actuator, such as a joint motor 27 disposed between adjacent links 18 (see FIG. 2). The joint motors 27 are configured to rotate the links 18. As such, positions of the links 18 are set by joint motors 27. Each joint motor 27 may be attached to a structural frame internal to the manipulator 14. In one example, the joint motor 27 is a servo motor, such as a permanent magnet brushless motor. The joint motor 27 may have other configurations, such as synchronous motors, brush-type DC motors, stepper motors, induction motors, and the like.

The joint motors 27 are positioned at one of a plurality of angular positions, hereinafter referred to as joint angles. The joint angle is the angle of the joint J between adjacent links 18. Each joint J may be configured to undergo a joint torque. The joint torque is a turning or twisting "force" of the joint J and is a function of the force applied at a length from a pivot point of the joint J. A torque sensor may be connected to one or more joint motors 27 for measuring the joint torque of the joint J. Alternatively, signals representative of currents applied to the joint motors 27 may be used to measure the joint torques.

One or more joint motors 27 may be equipped with a position sensor or encoder 19. For simplicity, one joint encoder 19 is illustrated in FIG. 1, although other joint encoders 19 may be similarly illustrated. Alternatively, one or more links 18 being driven by that joint motor 27 may be equipped with the position sensor or encoder 19. The encoder 19 may measure the joint angle of the respective joint J. In some embodiments, two encoders, one for the joint motor 27 and one for the link 18 being moved can be used to determine the joint angle, such as by averaging the joint angle, and the displacement between joint motor 27 and joint through the compliant transmission. The manipulator 14 need not require joint encoders 19 but may alternatively, or additionally, utilize motor encoders present on joint motors 27 at one or more joints J. Also, the manipulator 14 need not require rotary joints, but may alternatively, or additionally, utilize one or more prismatic joints. Certain joints J may be passively moveable and lockable while other joints J may be actively driven. Any suitable combination of joint types is contemplated.

Referring to FIG. 1, the base 16 of the manipulator 14 is generally a portion of the manipulator 14 that provides a fixed reference coordinate system for other components of the manipulator 14 or the system 10 in general. Generally, the origin of a manipulator coordinate system MNPL is defined at the fixed reference of the base 16. The base 16 may be defined with respect to any suitable portion of the manipulator 14, such as one or more of the links 18. Alternatively, or additionally, the base 16 may be defined with respect to the manipulator cart 17, such as where the manipulator 14 is physically attached to the manipulator cart 17. In one example, the base 16 is defined at an intersection of the axes of joints J1 and J2. Thus, although joints J1 and J2 are moving components in reality, the intersection of the axes of joints J1 and J2 is nevertheless a virtual fixed reference pose, which provides both a fixed position and orientation reference and which does not move relative to the manipulator 14 and/or manipulator cart 17. In other examples, the manipulator 14 can be a hand-held manipulator where the base 16 is a base portion of a tool (e.g., a portion held free-hand by the user or coupled to a set-up linkage) and the tool tip is movable (e.g., semi-autonomously) relative to the base portion. The base portion has a reference coordinate system that is tracked, and the tool tip has a tool tip coordinate system that is computed relative to the reference coordinate system (e.g., via motor and/or joint encoders and forward kinematic calculations). Movement of the tool tip can be controlled to follow the path since its pose relative to the path can be determined. Such a hand-held configuration can be like that described in U.S. Pat. No. 9,707,043, entitled "Surgical Instrument Including Housing, a Cutting Accessory that Extends from the Housing and Actuators that Establish the Position of the Cutting Accessory Relative to the Housing" the entire contents of which are hereby incorporated by reference.

A tool 20 couples to the manipulator 14 and is movable relative to the base 16 to interact with the anatomy in certain modes. The tool 20 is a physical and surgical tool and is or forms part of an end effector 22 supported by the manipulator 14 in certain embodiments. The tool 20 may be grasped by the user. One possible arrangement of the manipulator 14 and the tool 20 is described in U.S. Pat. No. 9,119,655, entitled, "Surgical Manipulator Capable of Controlling a Surgical Instrument in Multiple Modes," the disclosure of which is hereby incorporated by reference. The manipulator 14 and the tool 20 may be arranged in alternative configurations. The tool 20 can be like that shown in U.S. Patent Application Publication No. 2014/0276949, filed on Mar. 15, 2014, entitled, "End Effector of a Surgical Robotic Manipulator," hereby incorporated by reference.

The tool 20 includes an energy applicator 24 designed to contact and remove the tissue of the patient 12 at the surgical site. In one example, the energy applicator 24 is a bur 25 or surgical cutter. The tool 20 may comprise a tool shaft 33 having a proximal end coupled to the manipulator 14 and a distal end where the energy applicator 24 is located. The tool shaft 33 rotates about a cutting axis such that the energy applicator 24 can manipulate the tissue. The bur 25 may be substantially spherical and comprise a spherical center, radius (r) and diameter. Alternatively, the energy applicator 24 may be a drill bit, a saw blade, an ultrasonic vibrating tip, or the like. The tool 20 and/or energy applicator 24 may comprise any geometric feature, e.g., perimeter, circumference, radius, diameter, width, length, volume, area, surface/plane, range of motion envelope (along any one or more axes), etc. The geometric feature may be considered to determine how to locate the tool 20 relative to the tissue at the surgical site to perform the desired treatment. In some of the embodiments described herein, a spherical bur having a tool center point (TCP) will be described for convenience and ease of illustration but is not intended to limit the tool 20 to any particular form.

One example of the manipulator 14 is shown in FIG. 2. In this example, the manipulator 14 has a serial arm configuration. More specifically, the manipulator 14 includes five links 18a, 18b, 18c, 18d, 18e, wherein link 18a is most proximal to the base 16 and link 16e is most distal to the base 16. The manipulator 14 in FIG. 2 also comprises six joints identified as J1, J2, J3, J4, J5, J6. Joint J1 is disposed between the base 16 and link 18a. Joint J2 is disposed between link 18a and link 18b. Joint J3 is disposed between link 18b and link 18c. Joint J4 is disposed between link 18c and link 18d. Joint J5 is disposed between link 18d and link 18e. Joint J6 is disposed between link 18e and the end effector 22. Since the manipulator 14 in FIG. 2 is a serial arm, movement of any one joint J1-J6 causes movement to all links downstream (i.e., all links from the moved joint to the distal end of the manipulator).

Each joint J1-J6 is configured to rotate about its own individual axis A1, A2, A3, A4, A5, A6, respectively. By having the six joints, J1-J6, the manipulator 14 is free to move in 6 degrees of freedom (DOF). That is, the manipulator 14 is free to move forward/backward, up/down, and left/right translationally along in three perpendicular axes. The manipulator 14 is also free to change orientation through rotational movement about the three perpendicular axes, often termed pitch, yaw, and roll. Those skilled in the art appreciate that the manipulator 14 may implement movement in 5DOF depending on factors, such as whether the tool 20 needs to be rotated about its own axis. For example, when burring, the manipulator 14 may operate in 5DOF since the burr separately rotates. In such instances, there is redundancy because the number of joints is greater than the number of degrees-of-freedom required. When sawing, the manipulator 14 may operate in 6DOF.

Joint J1, located at the base 16, effects movement similar to rotating of a waist. By rotating about axis A1, joint J1 allows the manipulator 14 to rotate from left to right. Joint J2 effects movement like rotating of a shoulder. By rotating about axis A2, joint J2 allows the manipulator 14 to extend forward and backward. Joint J3 effects movement like bending of an elbow. By rotating about axis A3, joint J3 allows the manipulator 14 to raise and lower. Joint J4 effects movement like twisting of a wrist. By rotating about axis A4, joint J4 allows the manipulator 14 to rotate the upper links 18d, 18e in a circular motion thereby changing orientation of the tool 20. Joint J5 effects movement like bending of a wrist. By rotating about axis A5, joint J5 allows the link 18e and the surgical tool 20 to tilt up and down and is responsible for pitch and yaw motion. Like J4, joint J6 effects movement similar to twisting of a wrist. Joint J6 rotates about axis A6 to allow more precise control of the tool 20.

Referring to FIG. 3, a kinematic chain KC is formed by the manipulator 14, including any rigidly attached components such as the base 16, the plurality of links 18 and joints J, the tool 20 including the shaft 33 (if applicable) and the energy applicator 24. The end effector 22 can also be part of the kinematic chain KC. Furthermore, any mounting system or sterile interface coupled between the manipulator 14 and end effector 22 can be part of the kinematic chain KC. One example of the mounting system and/or sterile interface mechanism that can be part of the kinematic chain KC is described in United States Patent Application Publication No. US 2020/0170724A1, entitled "Mounting System With Sterile Barrier Assembly For Use In Coupling Surgical Components", the entire contents of which are incorporated by reference herein. As used herein, the term "kinematic chain" is an assembly of rigid bodies connected by joints, wherein the rigidity of the bodies enables constrained motion such that kinematics of the rigid bodies can be determined and related to other rigid bodies in the chain using a mathematical model. In the example of FIG. 3, the kinematic chain KC further forms a "mechanism" because at least one link being mechanically grounded.

As shown in FIG. 2, a sensor S, such as a force-torque sensor, may be mounted between the distal link 18e and the end effector 22. The force-torque sensor S is configured to output variable signals as a function of a force and/or a torque to which the end effector 22 and/or tool 20 are exposed. By doing so, the force-torque sensor S allows sensing of an input force applied to the end effector 22 and/or tool 20 by the user. The input force can be utilized to control movement of the manipulator 14 to emulate the user's applied force/torque. The force-torque sensor S may also sense external forces applied to the energy applicator 24. In one implementation, the force-torque sensor S is a 6DOF sensor such that the force-torque sensor S is configured to output signals representative of three mutually orthogonal forces and three torques about the axes of the orthogonal forces that are applied to the tool 20. Additionally, or alternatively, the input force applied to the end effector 22 and/or tool 20 may be determined using joint torques or electrical current sensors on the joint motors 27.

Referring to FIG. 1, the manipulator 14 and/or manipulator cart 17 may house a manipulator controller 26, or other type of control unit. The manipulator controller 26 may comprise one or more computers, or any other suitable form of controller that directs the motion of the manipulator 14. The manipulator controller 26 may have a central processing unit (CPU) and/or other processors, memory (not shown), and storage (not shown). The manipulator controller 26 is loaded with software as described below. The processors could include one or more processors to control operation of the manipulator 14. The processors can be any type of microprocessor, multi-processor, and/or multi-core processing system. The manipulator controller 26 may additionally, or alternatively, comprise one or more microcontrollers, field programmable gate arrays, systems on a chip, discrete circuitry, and/or other suitable hardware, software, or firmware that can carry out the functions described herein. The term processor is not intended to limit any implementation to a single processor. The manipulator 14 may also comprise a user interface UI with one or more displays and/or input devices (e.g., push buttons, keyboard, mouse, microphone (voice-activation), gesture control devices, touchscreens, etc.).

The tool 20 may comprise a tool controller 21 to control operation of the tool 20, such as to control power to the tool (e.g., to a rotary motor of the tool 20), control movement of the tool 20, control irrigation/aspiration of the tool 20, and/or the like. The tool controller 21 may be in communication with the manipulator controller 26 or other components. The tool 20 may also comprise a user interface UI with one or more displays and/or input devices (e.g., push buttons, keyboard, mouse, microphone (voice-activation), gesture control devices, touchscreens, etc.). The manipulator controller 26 controls a state (position and/or orientation) of the tool 20 (e.g., the TCP) with respect to a coordinate system, such as the manipulator coordinate system MNPL. The manipulator controller 26 can control (linear or angular) velocity, acceleration, or other derivatives of motion of the tool 20.

The tool center point (TCP), in one example, is a predetermined reference point defined at the energy applicator 24. The TCP has a known, or able to be calculated (i.e., not necessarily static), pose relative to other coordinate systems. The geometry of the energy applicator 24 is known in or defined relative to a TCP coordinate system. The TCP may be located at the spherical center of the bur 25 of the tool 20 such that one point is tracked. The TCP may be defined in various ways depending on the configuration of the energy applicator 24. The manipulator 14 could employ the joint/motor encoders, or any other non-encoder position sensing method, to enable a pose of the TCP to be determined. The manipulator 14 may use joint measurements to determine TCP pose and/or could employ techniques to measure TCP pose directly. The control of the tool 20 is not limited to a center point. For example, any suitable primitives, meshes, etc., can be used to represent the tool 20.

As shown in FIG. 1, the system 10 may further include a navigation system 32. One example of the navigation system 32 is described in U.S. Pat. No. 9,008,757, filed on Sep. 24, 2013, entitled, "Navigation System Including Optical and Non-Optical Sensors," hereby incorporated by reference. The navigation system 32 tracks movement of various objects. Such objects include, for example, the manipulator 14, the tool 20 and the anatomy, e.g., femur F and tibia T. The navigation system 32 tracks these objects to gather state information of the objects with respect to a (navigation) localizer coordinate system LCLZ. Coordinates in the localizer coordinate system LCLZ may be transformed to the manipulator coordinate system MNPL, and/or vice-versa, using transformations.

The navigation system 32 includes a cart assembly 34 that houses a navigation controller 36, and/or other types of control units. A navigation user interface UI is in operative communication with the navigation controller 36. The navigation user interface includes one or more displays 38. The navigation system 32 can display a graphical representation of the relative states of the tracked objects to the user using the one or more displays 38. The navigation user interface UI further comprises one or more input devices to input information into the navigation controller 36 or otherwise to select/control certain aspects of the navigation controller 36. Such input devices include interactive touchscreen displays. The input devices may include any one or more of push buttons, a keyboard, a mouse, a microphone (voice-activation), gesture control devices, and the like.

The navigation system 32 also includes a navigation localizer 44 coupled to the navigation controller 36. In one example, the localizer 44 is an optical localizer and includes a camera unit 46. The camera unit 46 has an outer casing 48 that houses one or more optical sensors 50. The localizer 44 may comprise its own localizer controller 49 and may further comprise a video camera VC.

The navigation system 32 includes one or more trackers. In one example, the trackers include a pointer tracker PT, one or more manipulator trackers 52A, 52B, a first patient tracker 54, and a second patient tracker 56. In the illustrated example of FIG. 1, the manipulator tracker is firmly attached to the tool 20 (i.e., tracker 52A), the first patient tracker 54 is firmly affixed to the femur F of the patient 12, and the second patient tracker 56 is firmly affixed to the tibia T of the patient 12. In this example, the patient trackers 54, 56 are firmly affixed to sections of bone. The pointer tracker PT is firmly affixed to a pointer P used for registering the anatomy to the localizer coordinate system LCLZ. The manipulator tracker 52A, 52B may be affixed to any suitable component of the manipulator 14, in addition to, or other than the tool 20, such as the base 16 (i.e., tracker 52B), or any one or more links 18 of the manipulator 14. The trackers 52A, 52B, 54, 56, PT may be fixed to their respective components in any suitable manner. For example, the trackers may be rigidly fixed, flexibly connected (optical fiber), or not physically connected at all (ultrasound), as long as there is a suitable (supplemental) way to determine the relationship (measurement) of that respective tracker to the object that it is associated with.

Any one or more of the trackers may include active markers 58. The active markers 58 may include light emitting diodes (LEDs). Alternatively, the trackers 52A, 52B, 54, 56, PT may have passive markers, such as reflectors, which reflect light emitted from the camera unit 46. Other suitable markers not specifically described herein may be utilized.

The localizer 44 tracks the trackers 52A, 52B, 54, 56, PT to determine a state of the trackers 52A, 52B, 54, 56, PT, which correspond respectively to the state of the object respectively attached thereto. The localizer 44 may perform known triangulation techniques to determine the states of the trackers 52, 54, 56, PT, and associated objects. The localizer 44 provides the state of the trackers 52A, 52B, 54, 56, PT to the navigation controller 36. In one example, the navigation controller 36 determines and communicates the state the trackers 52A, 52B, 54, 56, PT to the manipulator controller 26. As used herein, the state of an object includes, but is not limited to, data that defines the position and/or orientation of the tracked object or equivalents/derivatives of the position and/or orientation. For example, the state may be a pose of the object, and may include linear velocity data, and/or angular velocity data, and the like.

The navigation controller 36 may comprise one or more computers, or any other suitable form of controller. Navigation controller 36 has a central processing unit (CPU) and/or other processors, memory (not shown), and storage (not shown). The processors can be any type of processor, microprocessor, or multi-processor system. The navigation controller 36 is loaded with software. The software, for example, converts the signals received from the localizer 44 into data representative of the position and orientation of the objects being tracked. The navigation controller 36 may additionally, or alternatively, comprise one or more microcontrollers, field programmable gate arrays, systems on a chip, discrete circuitry, and/or other suitable hardware, software, or firmware that can carry out the functions described herein. The term processor is not intended to limit to a single processor.

Although one example of the navigation system 32 is shown that employs triangulation techniques to determine object states, the navigation system 32 may have any other suitable configuration for tracking the manipulator 14, tool 20, and/or the patient 12. In another example, the navigation system 32 and/or localizer 44 are ultrasound-based. For example, the navigation system 32 may comprise an ultrasound imaging device coupled to the navigation controller 36. The ultrasound imaging device images any of the aforementioned objects, e.g., the manipulator 14, the tool 20, and/or the patient 12, and generates state signals to the navigation controller 36 based on the ultrasound images. The ultrasound images may be 2-D, 3-D, or a combination of both. The navigation controller 36 may process the images in near real-time to determine states of the objects. The ultrasound imaging device may have any suitable configuration and may be different than the camera unit 46 as shown in FIG. 1.

In another example, the navigation system 32 and/or localizer 44 are radio frequency (RF)-based. For example, the navigation system 32 may comprise an RF transceiver coupled to the navigation controller 36. The manipulator 14, the tool 20, and/or the patient 12 may comprise RF emitters or transponders attached thereto. The RF emitters or transponders may be passive or actively energized. The RF transceiver transmits an RF tracking signal and generates state signals to the navigation controller 36 based on RF signals received from the RF emitters. The navigation controller 36 may analyze the received RF signals to associate relative states thereto. The RF signals may be of any suitable frequency. The RF transceiver may be positioned at any suitable location to track the objects using RF signals effectively. Furthermore, the RF emitters or transponders may have any suitable structural configuration that may be much different than the trackers 52A, 52B, 54, 56, PT shown in FIG. 1.

In yet another example, the navigation system 32 and/or localizer 44 are electromagnetically based. For example, the navigation system 32 may comprise an EM transceiver coupled to the navigation controller 36. The manipulator 14, the tool 20, and/or the patient 12 may comprise EM components attached thereto, such as any suitable magnetic tracker, electro-magnetic tracker, inductive tracker, or the like. The trackers may be passive or actively energized. The EM transceiver generates an EM field and generates state signals to the navigation controller 36 based upon EM signals received from the trackers. The navigation controller 36 may analyze the received EM signals to associate relative states thereto. Again, such navigation system 32 examples may have structural configurations that are different than the navigation system 32 configuration shown in FIG. 1.

The navigation system 32 may have any other suitable components or structure not specifically recited herein. Furthermore, any of the techniques, methods, and/or components described above with respect to the navigation system 32 shown may be implemented or provided for any of the other examples of the navigation system 32 described herein. For example, the navigation system 32 may utilize solely inertial tracking or any combination of tracking techniques, and may additionally or alternatively comprise, fiber optic-based tracking, machine-vision tracking, and the like.

Figure 4:
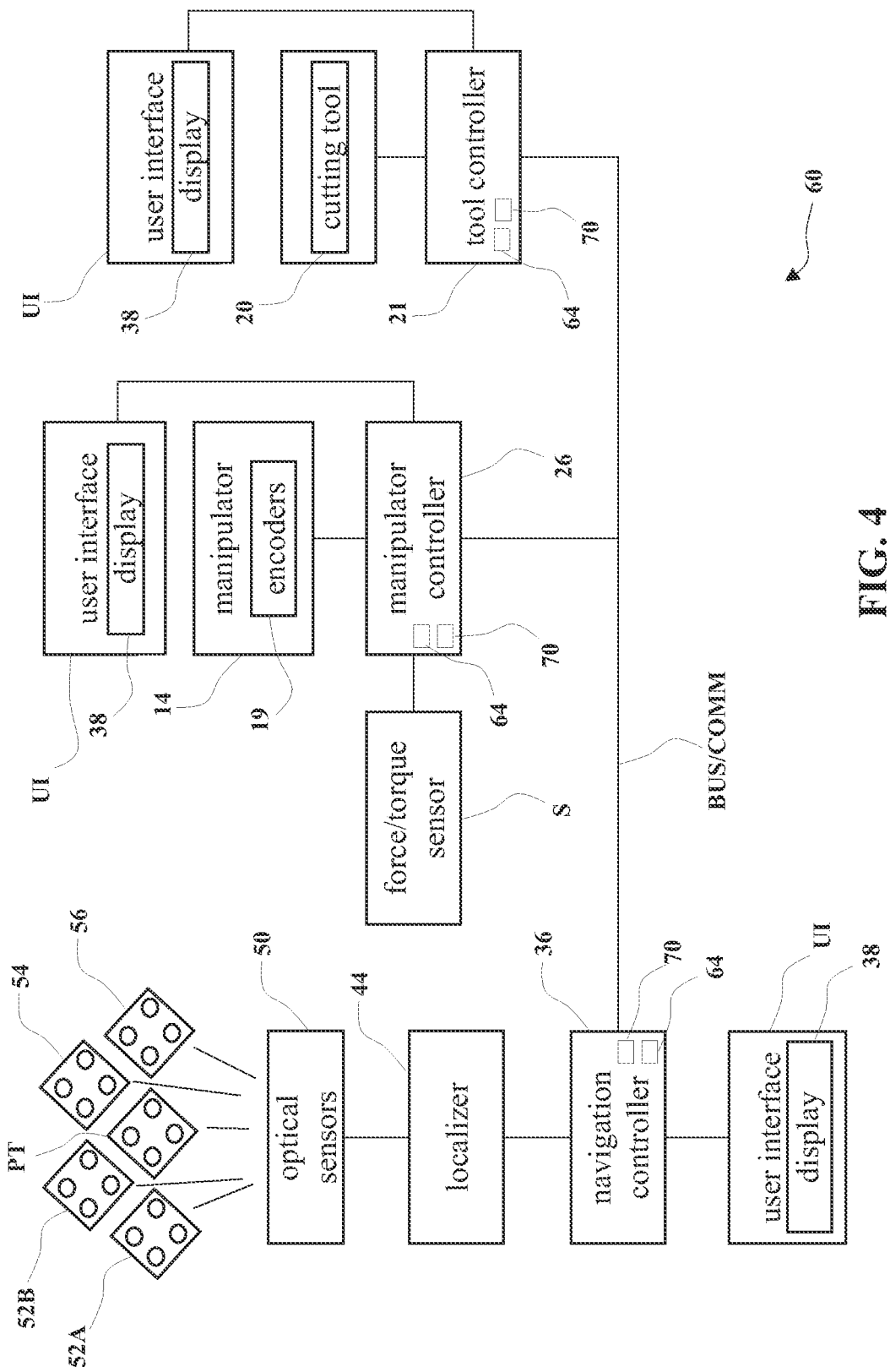
FIG. 4 is a block diagram of a control system, including components and controllers, for controlling the robotic surgical system, according to one implementation.

Referring to FIG. 4, the system 10 includes a control system 60 that comprises, among other components, the manipulator controller 26, the navigation controller 36, and the tool controller 21. The control system 60 further includes one or more software programs and software modules shown in FIG. 5. The software modules may be part of the program or programs that operate on the manipulator controller 26, navigation controller 36, tool controller 21, or any combination thereof, to process data to assist with control of the system 10. The software programs and/or modules include computer readable instructions stored in non-transitory memory 64 on the manipulator controller 26, navigation controller 36, tool controller 21, or a combination thereof, to be executed by one or more processors 70 of the controllers 21, 26, 36. The memory 64 may be any suitable configuration of memory, such as RAM, non-volatile memory, etc., and may be implemented locally or from a remote database. Additionally, software modules for prompting and/or communicating with the user may form part of the program or programs and may include instructions stored in memory 64 on the manipulator controller 26, navigation controller 36, tool controller 21, or any combination thereof. The user may interact with any of the input devices of the navigation user interface UI or other user interface UI to communicate with the software modules. The user interface software may run on a separate device from the manipulator controller 26, navigation controller 36, and/or tool controller 21.

The control system 60 may comprise any suitable configuration of input, output, and processing devices suitable for carrying out the functions and methods described herein. The control system 60 may comprise the manipulator controller 26, the navigation controller 36, or the tool controller 21, or any combination thereof, or may comprise one of these controllers. These controllers may communicate via a wired bus or communication network as shown in FIG. 4, via wireless communication, or otherwise. The control system 60 may also be referred to as a controller. The control system 60 may comprise one or more microcontrollers, field programmable gate arrays, systems on a chip, discrete circuitry, sensors, displays, user interfaces, indicators, and/or other suitable hardware, software, or firmware that is capable of carrying out the functions described herein.

Figure 5:
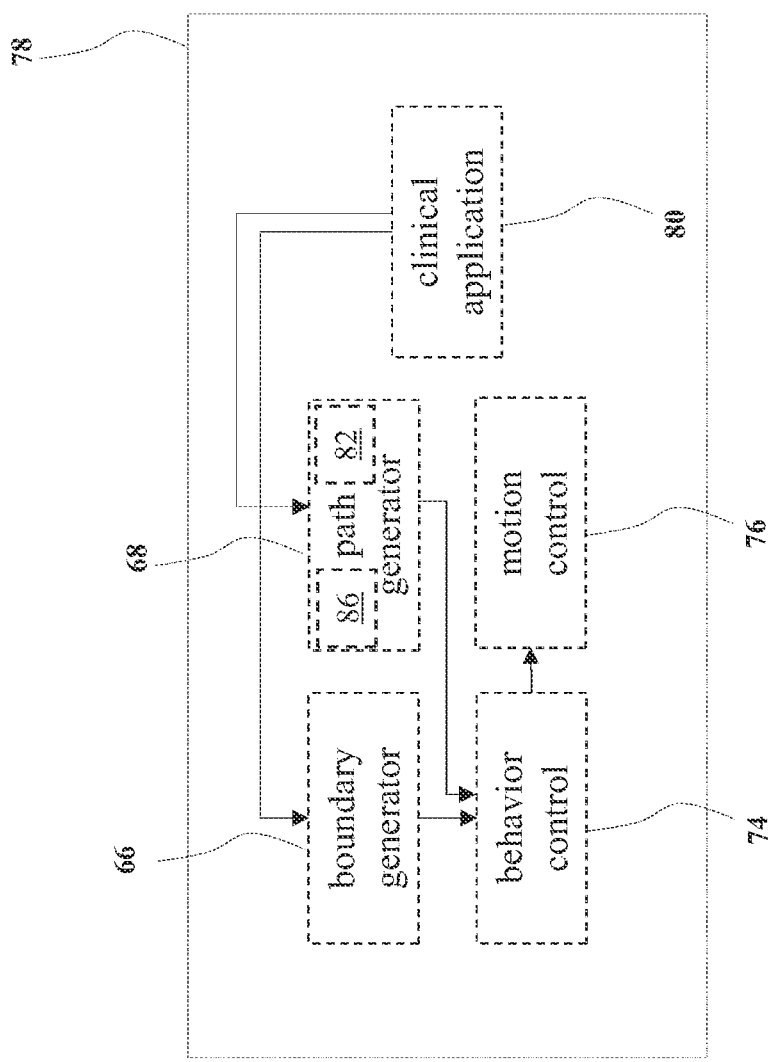
FIG. 5 is a functional block diagram of a software program utilized by the robotic surgical system, according to one implementation.

Referring to FIG. 5, the software employed by the control system 60 includes a boundary generator 66. As shown in FIG. 6, the boundary generator 66 is a software program or module that generates a virtual boundary 71 for constraining movement and/or operation of the tool 20. The virtual boundary 71 may be one-dimensional, two-dimensional, three-dimensional, and may comprise a point, line, axis, trajectory, plane, or other shapes, including complex geometric shapes. In some embodiments, the virtual boundary 71 is a surface defined by a triangle mesh. Such virtual boundaries 71 may also be referred to as virtual objects. The virtual boundaries 71 may be defined with respect to an anatomical model AM, such as a 3-D bone model. In the example of FIG. 6, the virtual boundaries 71 are planar boundaries to delineate five planes for a total knee implant, and are associated with a 3-D model of the head of the femur F. The anatomical model AM is registered to the one or more patient trackers 54, 56 such that the virtual boundaries 71 become associated with the anatomical model AM. The virtual boundaries 71 may be implant-specific, e.g., defined based on a size, shape, volume, etc. of an implant and/or patient-specific, e.g., defined based on the patient's anatomy. The virtual boundaries 71 may be boundaries that are created pre-operatively, intra-operatively, or combinations thereof. In other words, the virtual boundaries 71 may be defined before the surgical procedure begins, during the surgical procedure (including during tissue removal), or combinations thereof. In any case, the control system 60 obtains the virtual boundaries 71 by storing/retrieving the virtual boundaries 71 in/from memory, obtaining the virtual boundaries 71 from memory, creating the virtual boundaries 71 pre-operatively, creating the virtual boundaries 71 intra-operatively, or the like.

The manipulator controller 26 and/or the navigation controller 36 track the state of the tool 20 relative to the virtual boundaries 71. In one example, the state of the TCP is measured relative to the virtual boundaries 71 for purposes of determining haptic forces to be applied to a virtual rigid body model via a virtual simulation so that the tool 20 remains in a desired positional relationship to the virtual boundaries 71 (e.g., not moved beyond them). The results of the virtual simulation are commanded to the manipulator 14. The control system 60 controls/positions the manipulator 14 in a manner that emulates the way a physical handpiece would respond in the presence of physical boundaries/barriers. The boundary generator 66 may be implemented on the manipulator controller 26. Alternatively, the boundary generator 66 may be implemented on other components, such as the navigation controller 36.

Referring to FIGS. 5 and 7, a path generator 68 is another software program or module run by the control system 60. In one example, the path generator 68 is run by the manipulator controller 26. The path generator 68 generates a tool path TP for the tool 20 to traverse, such as for removing sections of the anatomy to receive an implant. The tool path TP may comprise a plurality of path segments PS, or may comprise a single path segment PS. The path segments PS may be straight segments, curved segments, combinations thereof, or the like. The tool path TP may also be defined with respect to the anatomical model AM. The tool path TP may be implant-specific, e.g., defined based on a size, shape, volume, etc. of an implant and/or patient-specific, e.g., defined based on the patient's anatomy.

In one version described herein, the tool path TP is defined as a tissue removal path, but, in other versions, the tool path TP may be used for treatment other than tissue removal. One example of the tissue removal path described herein comprises a milling path 72. The term "milling path" generally refers to the path of the tool 20 in the vicinity of the target site for milling the anatomy and is not intended to require that the tool 20 be operably milling the anatomy throughout the entire duration of the path. For instance, as will be understood in further detail below, the milling path 72 may comprise sections or segments where the tool 20 transitions from one location to another without milling. Additionally, other forms of tissue removal along the milling path 72 may be employed, such as tissue ablation, and the like. The milling path 72 may be a predefined path that is created pre-operatively, intra-operatively, or combinations thereof. In other words, the milling path 72 may be defined before the surgical procedure begins, during the surgical procedure (including during tissue removal), or combinations thereof. In any case, the control system 60 obtains the milling path 72 by storing/retrieving the milling path 72 in/from memory, obtaining the milling path 72 from memory, creating the milling path 72 pre-operatively, creating the milling path 72 intra-operatively, or the like. The milling path 72 may have any suitable shape, or combinations of shapes, such as circular, helical/corkscrew, linear, curvilinear, combinations thereof, and the like.

One example of a system and method for generating the virtual boundaries 71 and/or the milling path 72 is described in U.S. Pat. No. 9,119,655, entitled, "Surgical Manipulator Capable of Controlling a Surgical Instrument in Multiple Modes," the disclosure of which is hereby incorporated by reference. In some examples, the virtual boundaries 71 and/or milling paths 72 may be generated offline rather than on the manipulator controller 26 or navigation controller 36. Thereafter, the virtual boundaries 71 and/or milling paths 72 may be utilized at runtime by the manipulator controller 26.

Referring to FIG. 5, two additional software programs or modules run on the manipulator controller 26 and/or the navigation controller 36. One software module performs behavior control 74. Behavior control 74 is the process of computing data that indicates the next commanded position CP of the energy applicator 24 and/or orientation (e.g., pose) for the tool 20. In some cases, the position of the TCP is output from the behavior control 74, while in other cases, the position and orientation of the tool 20 is output. Output from the boundary generator 66, the path generator 68, and a force/torque sensor S may feed as inputs into the behavior control 74 to determine the next commanded position CP for the energy applicator 24 and/or orientation for the tool 20. The behavior control 74 may process these inputs, along with one or more virtual constraints described further below, to determine the commanded pose.

The second software module performs motion control 76. One aspect of motion control is the control of the manipulator 14. The motion control 76 receives data defining the next commanded pose from the behavior control 74. Based on these data, the motion control 76 determines the next position of the joint angles of the joints J of the manipulator 14 (e.g., via inverse kinematics and Jacobian calculators) so that the manipulator 14 is able to position the tool 20 as commanded by the behavior control 74, e.g., at the commanded pose. In other words, the motion control 76 processes the commanded pose, which may be defined in Cartesian space, into joint angles of the manipulator 14, so that the manipulator controller 26 can command the joint motors 27 accordingly, to move the joints J of the manipulator 14 to commanded joint angles corresponding to the commanded pose of the tool 20. In one version, the motion control 76 regulates the joint angle of the joints J and adjusts the torque that joint motors 27 output to, as closely as possible, ensure that the joint motor 27 drives the associated joint J to the commanded joint angle.

Any of the boundary generator 66, path generator 68, behavior control 74, and motion control 76 may be sub-sets of a software program 78 or software programs that operate separately and/or independently in any combination thereof. The term "software program" is used herein to describe the computer-executable instructions that are configured to carry out the various capabilities of the technical solutions described. For simplicity, the term "software program" is intended to encompass, at least, any one or more of the boundary generator 66, path generator 68, behavior control 74, and/or motion control 76. The software program 78 can be implemented on the manipulator controller 26, navigation controller 36, or any combination thereof, or may be implemented in any suitable manner by the control system 60.

A clinical application 80 may be provided to handle user interaction. The clinical application 80 handles many aspects of user interaction and coordinates the surgical workflow, including pre-operative planning, implant placement, registration, bone preparation visualization, and post-operative evaluation of implant fit, etc. The clinical application 80 is configured to output to the displays 38. The clinical application 80 may run on its own separate processor or may run alongside the navigation controller 36. In one example, the clinical application 80 interfaces with the boundary generator 66 and/or path generator 68 after implant placement is set by the user, and then sends the virtual boundary 71 and/or tool path TP returned by the boundary generator 66 and/or path generator 68 to the manipulator controller 26 for execution. Manipulator controller 26 executes the tool path TP as described herein. The manipulator controller 26 may additionally create certain segments (e.g., lead-in segments) when starting or resuming machining to smoothly get back to the generated tool path TP. The manipulator controller 26 may also process the virtual boundaries 71 to generate corresponding virtual constraints as described further below.

The system 10 may operate in a manual mode, such as described in U.S. Pat. No. 9,119,655, incorporated herein by reference. Here, the user manually directs, and the manipulator 14 executes movement of the tool 20 and its energy applicator 24 at the surgical site. The user physically contacts the tool 20 to cause movement of the tool 20 in the manual mode. In one version, the manipulator 14 monitors forces and torques placed on the tool 20 by the user in order to position the tool 20. For example, the manipulator 14 may comprise the force/torque sensor S that detects the forces and torques applied by the user and generates corresponding input used by the control system 60 (e.g., one or more corresponding input/output signals).

The manipulator controller 26 and/or the navigation controller 36 receives the input (e.g., signals) from the force/torque sensor S. In response to the user-applied forces and torques, the manipulator 14 moves the tool 20 in a manner that emulates the movement that would have occurred based on the forces and torques applied by the user. Movement of the tool 20 in the manual mode may also be constrained in relation to the virtual boundaries 71 generated by the boundary generator 66. In some versions, measurements taken by the force/torque sensor S are transformed from a force/torque coordinate system FT of the force/torque sensor S to another coordinate system, such as a virtual mass coordinate system in which a virtual simulation is carried out on the virtual rigid body model of the tool 20 so that the forces and torques can be virtually applied to the virtual rigid body in the virtual simulation to ultimately determine how those forces and torques (among other inputs) would affect movement of the virtual rigid body, as described below.

The system 10 may also operate in a semi-autonomous mode in which the manipulator 14 moves the tool 20 along the milling path 72 (e.g., the active joints J of the manipulator 14 operate to move the tool 20 without requiring force/torque on the tool 20 from the user). An example of operation in the semi-autonomous mode is also described in U.S. Pat. No. 9,119,655, incorporated herein by reference. In some embodiments, when the manipulator 14 operates in the semi-autonomous mode, the manipulator 14 can move the tool 20 free of user assistance. Free of user assistance may mean that a user does not physically contact the tool 20 to move the tool 20. Instead, the user may use some form of remote control to control starting and stopping of movement. For example, the user may hold down a button of the remote control to start movement of the tool 20 and release the button to stop movement of the tool 20.

The control system 60 including the manipulator controller 26 and behavior controller 74 are configured to simulate dynamics of the tool 20 in a virtual simulation. The virtual simulation may be based on the tool 20 with or without the energy applicator 24. In one example, the virtual simulation is implemented using a physics engine, which is computer software that simulates rigid body dynamics. The virtual simulation may be implemented on a computing device having a non-transitory computer-readable storage medium 64 with an executable program stored thereon. The virtual simulation simulates dynamics of the tool 20 before such dynamics of the tool 20 are physically performed by the manipulator 14. The control system 60 models the tool 20 as a virtual rigid body being a dynamic object. Therefore, the control system 60 effectively simulates rigid body dynamics of the tool 20. The virtual rigid body is free to move according to 6DOF in Cartesian task space according to the virtual simulation. The virtual rigid body may be modeled as a single point, which may be on, within, or beyond the tool 20. A mass/inertia matrix defines the virtual mass in 6DOF. In one example, the virtual rigid body corresponds to a center of mass of the tool 20. Here "center of mass" is understood to be the point around which the tool 20 would rotate if a force is applied to another point of the tool 20 and the tool 20 were otherwise unconstrained, i.e., not constrained by the manipulator 14. The center of mass of the virtual rigid body may be close to, but need not be the same as, the actual center of mass of the tool 20. The center of mass of the virtual rigid body can be determined empirically. Once the tool 20 is attached to the manipulator 14, the position of the center of mass can be reset to accommodate the preferences of the individual practitioners. In other embodiments, the virtual rigid body may correspond to other features of the tool 20, such as the center of gravity, or the like.

This virtual rigid body is considered to have a virtual mass. The virtual mass has an inertia about at least one of the joints J. In some instances, the virtual mass has inertia about each one of the joints (J1-J6). The inertia is a measure of a resistance that the virtual mass exhibits in response to changes in velocity. The inertia may be understood to be a property of the virtual mass. As such, the virtual mass may refer to both the mass and inertia of the virtual rigid body. The virtual mass of the virtual rigid body is typically within the same order of magnitude as an actual mass of tool 20. The virtual mass may be designed to be greater than or less than the actual mass of tool 20.

In one example, the virtual rigid body is in a first pose at commencement of each iteration of the virtual simulation. The control system 60 may receive the user applied input force from the force-torque sensor S and/or other input forces modeled as other constraints. The input forces are applied to the virtual rigid body in the virtual simulation when the virtual rigid body is in the first pose. The input forces result in the virtual rigid body advancing along a virtual path to a second pose having a different position and a different orientation within Cartesian space. Knowing the second pose of the virtual rigid body based on the virtual simulation, the control system 60 then commands action of the joints J in accordance with the virtual simulation. That is, the control system 60 converts the dynamics of the virtual rigid body in Cartesian space to direct the motion of the manipulator 14 and control orientation of the tool 20 in joint space. The forces resulting in the second pose are applied to a Jacobian calculator, which calculates Jacobian matrices relating motion within Cartesian space to motion within joint space.

The virtual simulation may be executed computationally without visual or graphical representations of the virtual rigid body. It is not necessary that the virtual simulation virtually display dynamics of the virtual rigid body. In other words, the virtual rigid body need not be modeled within a graphics application executed on a processing unit. In some instances, movement of a virtual tool, which is tracked to the actual tool 20, may be displayed at the surgical site to provide visual assistance during operation of the procedure. In such instances, the displayed tool is not directly a result of the virtual simulation.

II. Determining the Feed Rate

The speed or velocity at which the energy applicator 24 advances along a path is referred to as the feed rate FR. In one implementation, such advancement can be advancement in the semi-autonomous mode, and more specifically, along the tool path TP. This section describes techniques in which the feed rate FR is determined whether before or during the procedure. As will be described in this section, the feed rate FR can be set and changed based on various conditions and/or variables. As will be described in the next section, the feed rate FR can be dynamically changed to account for undesired orientational motion of non-tool path components of the kinematic chain KC. The feed rate FR can be computed by the techniques described in U.S. Pat. No. 9,119,655, entitled, "Surgical Manipulator Capable of Controlling a Surgical Instrument in Multiple Modes," the disclosure of which is hereby incorporated by reference.

To determine the feed rate FR according to one implementation, the path generator 68 calculates one or more variables. One of these variables are the forces and torques that when applied to the virtual rigid body, results in the advancement of the energy applicator 24. Another variable is forces and torques applied to the virtual rigid body to maintain the orientation of the tool 20 within an acceptable range of orientations.

Figure 8:
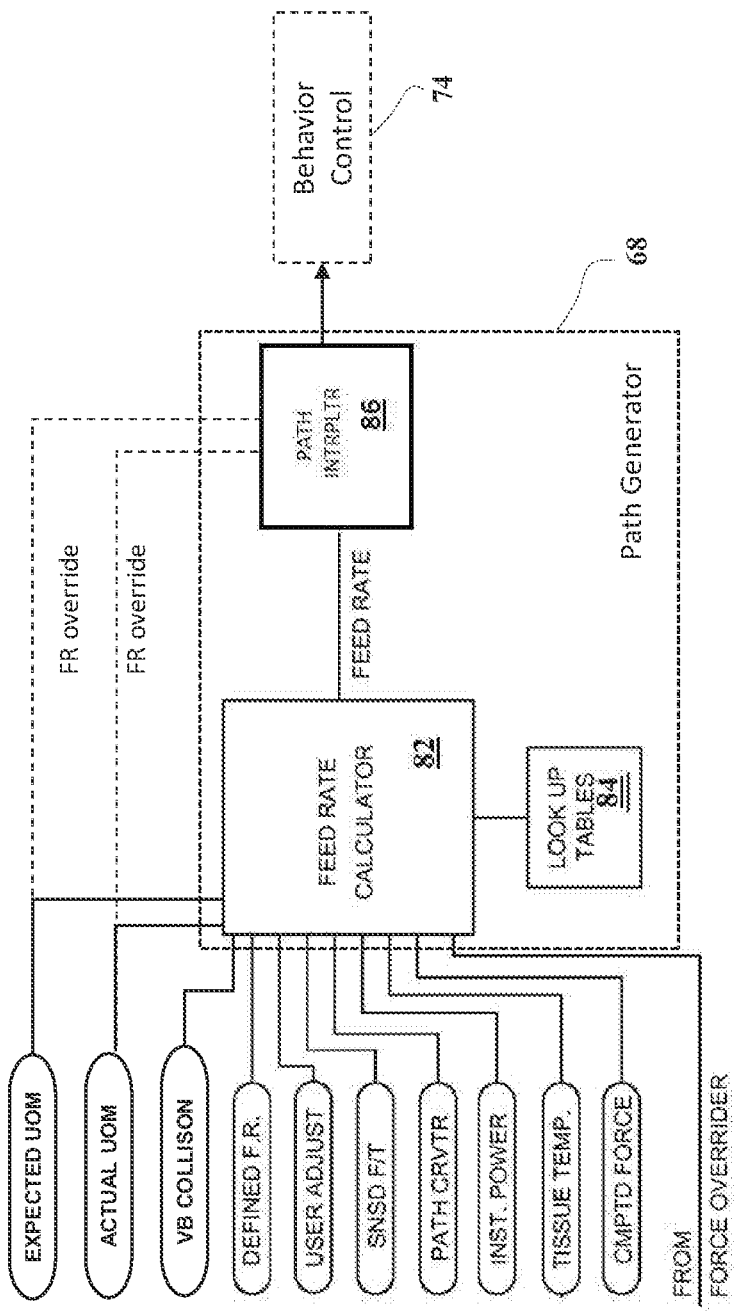
FIG. 8 is a block diagram of variable inputs that can be utilized by the path generator to determine the feed rate of the energy applicator.

In one example, path generator 68 includes a sub module, which is a feed rate calculator 82, as seen in FIGS. 5 and 8. Feed rate calculator 82 determines the feed rate FR at which the energy applicator 24 should move as it travels along an individual path segment PS of the tool path TP (see FIG. 9). An input into the feed rate calculator 82 can be the defined feed rate (DEFINED F.R.) In its most fundamental form, the defined feed rate FR is a scalar value. In practice, the manipulator controller 26 may be provided with plural defined feed rates FR. These defined feed rates can be used to set the default feed rates and may can be scaled or modified according to various variables, as described below. The defined feed rate need not always correspond to the actual feed rate FR by which the energy applicator 24 is advanced. Further, it is not necessarily required to have the defined feed rates set as the default. Instead, the system 10 can dynamically determine the actual feed rate FR based on any one or more of the following variables, without having started at the defined feed rate. In other words, the actual feed rate FR can be predetermined or determined "on the fly" without any default or defined feed rate previously determined.

Figure 9:
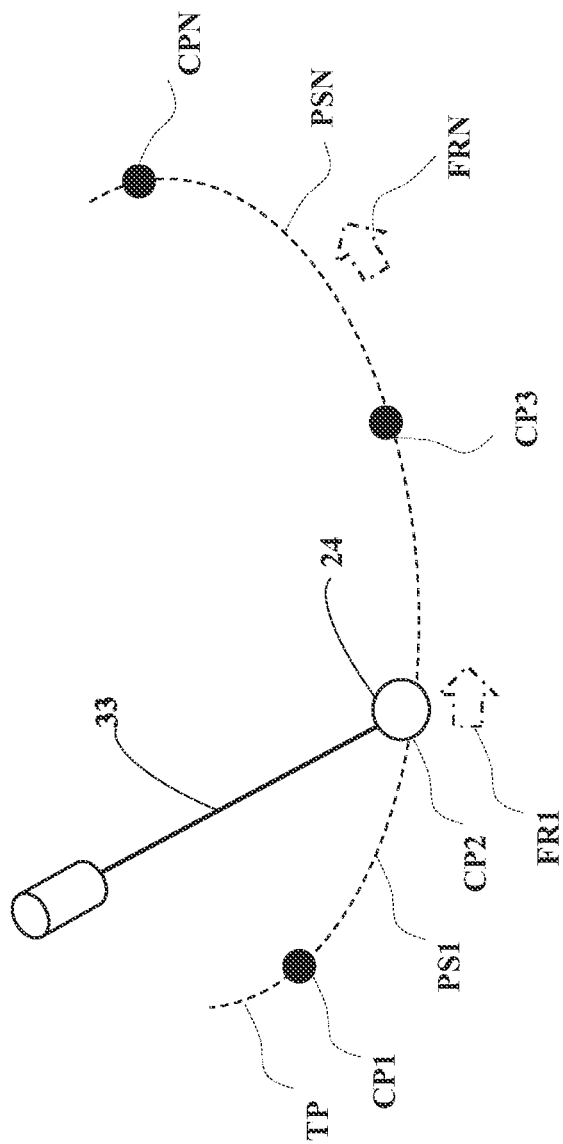
FIG. 9 illustrates one example of the energy applicator being advanced along a path segment of a tool path between commanded positions wherein a feed rate for the energy applicator is defined for path segments.

With reference to FIG. 9, in one example, a specific defined feed rate FR1 . . . FRN may be assigned to each path segment PS1 . . . PSN. This feed rate FR assignment may be performed preoperatively or intraoperatively. The feed rates FR can then be adjusted at the start of or during the procedure. Two or more contiguous path segments PS may be assigned the same or different defined feed rate FR. These feed rates FR can be generated based on variables such as, but not limited to: the shape of the void space; the type of energy applicator 24; the health of the patient; the nature of the tissue to which the energy applicator 24 is applied; and the geometry of the path segment PS, and the like. In practice, the defined feed rate FR is typically between 5 and 400 mm/sec. The feed rates can be greater or less than this range depending on the situation. According to one implementation the feed rate FR is predetermined based on a surgical plan, system settings, and/or surgeon preferences. Alternatively, or additionally, the feed rate FR can be determined and modified based on intraoperative conditions. Feed rates can also be assigned to path segments PS at the time when the energy applicator 24 reaches the next path segment PS, or at any time in advance of such.

As shown in FIG. 9, the one or more controllers, including but not limited to, the manipulator controller 26, including the path generator 68 and feed rate calculator 82, are configured to control the manipulator 14 to advance the energy applicator 24 to a plurality of commanded positions CP1-CPN according to the feed rate FR. The commanded positions CP are often, but not necessarily, defined with respect to the tool path TP in the semi-autonomous mode. In one implementation, the segments PS of the tool path TP are defined between subsequent commanded positions PS. Alternatively, the commanded positions CP may be determined pursuant to user-initiated and non-tool path motion that is emulated by the system 10 in the manual mode.

With reference to FIG. 8, the feed rate calculator 82 can adjust the defined feed rate to produce the feed rate FR. In one version, this adjustment is performed by multiplying the defined feed rate FR by any number of coefficients. Each coefficient can be between 0 and 1.0. Coefficients may have values that exceed 1.0. Each of these coefficients can change as a function of a variable that is also applied to the feed rate calculator 82.

A first of these variables can be the user adjustment (USER ADJUST) of the feed rate FR, as shown in FIG. 8. This is the adjustment of the feed rate FR that the practitioner performs, in real time, as the procedure progresses. The practitioner can make this adjustment of the feed rate by remote control, such as with the pendant 88 shown in FIG. 1. Examples of the pendant can be like those described in U.S. Pat. No. 9,119,655, entitled, "Surgical Manipulator Capable of Controlling a Surgical Instrument in Multiple Modes," the disclosure of which is hereby incorporated by reference. The feed rate calculator 82 outputs a coefficient as a function of the practitioner entered command to increase or decrease the feed rate FR.

A second variable that can be used to selectively scale the defined feed rate FR is force and torque to which the energy applicator 24 is exposed (SNSD F/T), as shown in FIG. 8. The energy applicator 24 is rigidly attached to the tool 20, which can be rigidly attached to the end effector 22. Accordingly, the signals output by the force/torque sensor S are the signals representative of the forces and torques to which energy applicator 24 is exposed. Feed rate calculator 82 can set the feed rate FR based on the principle that there is relationship between the amount of force/torque that the manipulator 14 applies to the tool 20 and energy applicator 24 and the rate of instrument advancement. Generally, it is a goal of modern medical practice to minimize the heating of tissue that is not being removed. One reason for this goal is to minimize the attendant damage this needless heating can cause to the tissue. Accordingly, manipulator 14 is configured to, when it is determined that an appreciable amount of force and/or torque is applied to the instrument or energy applicator 24, slow the feed rate FR for the path segment PS.

One example of where this adjustment of feed rate FR is useful is when the energy applicator 24 travels across a path segment PS through both cortical bone and cancellous bone. Cortical bone, the outer bone, is relatively hard. Cancellous bone, the inner bone, is more porous and less resistant to removal than cortical bone. Accordingly, if the energy applicator 24 moves across both types of bone at a constant speed, more force/torque is needed to be applied to move the applicator across the cortical bone than the cancellous bone. This means that, without adjustment of the feed rate FR, the cortical bone would be subject to more potentially damage inducing heating than the adjacent section of cancellous bone. This feature of the manipulator 14 minimizes this potential for the unwanted heating by slowing the feed rate FR in response to the force/torque sensor S providing signals indicating increases to the amount of force/torque required to advance the energy applicator 24.

Once the energy applicator 24 moves from cutting the cortical bone to cancellous bone, the force/torque required to advance the instrument decreases. In this situation, the feed rate FR can be increased without appreciably increasing the extent to which the bone to which the energy applicator 24 is applied is heated. This reduces the amount of time it takes to perform the procedure on the patient. This furthers the goal of modern surgical practice to minimize the time it takes to perform the procedure on the patient, which lessens the amount of time the patient's internal tissue is exposed and open to infection and lessens both the likelihood of surgeon fatigue and the amount of time the patient must be held under anesthesia.

Feed rate calculator 82 determines a force/torque adjustment coefficient as based on one, two or three of: (1) the magnitude of a six-component vector comprised of the individual force and torque components; (2) the magnitude of a three-component vector comprised of the individual force components; and (3) the magnitude of a vector comprised of any combination of individual force and/or torque components. Alternatively, the coefficient is based on one or more of the largest force or torque components. Based on one or more of these variables, feed rate calculator 82, by reference to data in an associated look-up table 84, can determine a force/torque adjustment coefficient.

In addition to adjusting the feed rate FR, the rotational cutting speed of the energy applicator 24 may also be varied. More specifically, where the energy applicator 24 is a bur, the speed of the cutting teeth of the bur may be adjusted and optimized to improve the accuracy of the tissue removal and to minimize heat generation at the tissue. The optimal speed of the bur cutting teeth is a factor of cutter rotational speed and cutter diameter, which are optimized based on the tooth geometry and the type of material being removed.

A third variable upon which the defined feed rate can be adjusted to produce the feed rate FR is the curvature of the path segment (PATH CRVTR), as shown in FIG. 8. This adjustment is performed to ensure that when the energy applicator 24 is positionally commanded and displaced along a curved path segment PS, the energy applicator 24 is not displaced at such a high rate of speed that the momentum causes the energy applicator 24 to move away from the tool path TP or path segment PS. In some examples, when the path segment PS is linear or has a relatively small curvature, the feed rate FR is not adjusted based on the curvature. When the feed rate calculator 82 receives an indication that the energy applicator 24 is traveling along a path segment PS with a relatively large curvature, or a small radius, the feed rate calculator 82 can downwardly adjust the defined feed rate FR, based on this variable in order to produce the feed rate FR.

The feed rate calculator 82 receives an indication of the curvature, the PATH CRVTR variable, of the path along which the energy applicator 24 is traveling from a curvature calculator, which can be another sub-module component of the path generator 68. Based on this input variable, the feed rate calculator 82 can refer to one of the look-up tables 84 to determine a coefficient that reflects the extent to which the feed rate FR should be adjusted. When the one or more path segments PS is linear or has a curvature approaching zero, the defined feed rate FR may not be adjusted based on the curvature and the coefficient is at or near 1.0. When the feed rate calculator 82 receives an indication that the energy applicator 24 is traveling along a path segment PS with a relatively large curvature, the calculator downwardly adjusts the defined feed rate, based on this variable in order to produce the feed rate FR. The retrieved coefficient decreases from unity. In some versions, if the curvature is 0.05 mm$^{-1}$ or lower, feed rate calculator 82 does not attenuate the feed rate FR based on the curvature of the segment PD along which the energy applicator 24 is advancing. A curvature calculator, based on data defining multiple spaced apart filtered target positions, determines the curvature of the current filtered path. Data representative of this curvature are forwarded to the feed rate calculator 82 as the PATH CRVTR variable.

Changing the feed rate FR to account for curvature of the path segment PS is based on positional (x, y, z) commanded or expected positions of the energy applicator 24 relative to the tool path TP, without regard to orientational motion (e.g., angular velocity, angular acceleration, angular jerk) of the energy applicator 24 nor any other components of the kinematic chain KC.

A fourth variable upon which the defined feed rate can be adjusted to produce the feed rate FR is instrument power (INST POWER), as shown in FIG. 8. This variable is the amount of power the tool 20 and/or energy applicator 24 applies to the patient. Instrument power is employed as an input variable for adjusting feed rate FR because, generally, as the power the instrument applies to the tissue increases, the extent to which the tissue is heated by this power also increases. As discussed above, it is beneficial to minimize the extent to which the tissue is subjected to the potentially damaging heating. There may also be situations in which the large outputting of power by the instrument indicates that manipulator 14 is entering a state in which, if feed rate FR is not reduced, the performance of the energy applicator 24 will drop. For example, if a large amount of power needs to be applied to the bur 25, this increase in power may indicate that the bur 25 may be entering a state in which it is having difficulty removing the material it should remove. To ensure that the bur 25 performs as expected, it is then beneficial to reduce the rate of advancement of the bur 25. This can help improve the accuracy with which material is removed. Improving the accuracy of tissue removal enhances the surface finish and definition of the tissue that remains after application of the bur 25. Accordingly, when there is an indication that the power applied by the tool 20 and/or energy applicator 24 increases, feed rate calculator 82 reduces the feed rate FR.

In constructions in which the tool 20 is a motorized tool, the power variable can be the amount of torque output by the tool motor. Generally, there is a directly proportional relationship between the current applied to the tool 20 and the torque output by the tool 20. Accordingly, a measure of the current drawn by the tool 20 is employed as the instrument power variable. The instrument power signal representative of this variable is generated by the tool controller 21 and applied to the manipulator controller 26. More particularly, a circuit of the tool controller 21 can monitor the current drawn by the tool 20 and output a signal representative of the current drawn by the tool 20. This signal is the root signal upon which either an analog or digital INST POWER signal applied to feed rate calculator 82 is generated. The feed rate calculator 82, based on the INST POWER signal and by reference to one of the look up tables 84, determines a coefficient that indicates the extent to which the defined feed rate should be scaled based on the instrument power to determine the feed rate FR.

A fifth variable that can be used as a factor for adjusting the defined feed rate to produce the feed rate FR is tissue temperature (TISSUE TEMP.), as shown in FIG. 8. This is due to the above-mentioned goal of modern surgical practice to minimize the extent that the patient's uncut tissue is heated. A temperature sensor can be utilized to provide an indication of the tissue temperature (TISSUE TEMP). The temperature sensor can be mounted to the tool 20. Again, the signal output by temperature sensor may be representative of the temperature of the tissue or the temperature of the energy applicator 24. The signal output by the temperature sensor can be routed through tool controller 21 to manipulator controller 26. In addition to the temperature of the uncut tissue, another factor for adjusting the defined feed rate may include the temperature of the chips removed by the energy applicator 24. The chips and material removed are often referred to as "slurry." The temperature of the slurry may be measured in any suitable manner including temperature sensor. Feed rate calculator 82, based on the temperature represented by the TISSUE TEMP signal and by reference to one of the look-up tables 84, determines the appropriate tissue temperature feed rate adjustment coefficient. If the TISSUE TEMP signal indicates that the tissue temperature is within an acceptable range, this coefficient may be at or near 1.0. Alternatively, if the TISSUE TEMP signal indicates that the tissue or energy applicator 24 temperature is approaching or above a level at which there may be appreciable damage to the tissue, the retrieved coefficient may decrease from unity.

A sixth variable that can employed by the feed rate calculator 82 to adjust the defined feed rate to generate the feed rate FR is the computed force (CMPTD FORCE), as shown in FIG. 8. As discussed below, this computed force is the force that is applied to the virtual rigid body. In response to this force, the motion control processes advance energy applicator 24 along the tool path TP. The computed force is computed by another one of the behavior control process software modules. This computed force, which can include torque components, serves as an input variable from which a commanded position for the energy applicator 24 is determined. Feed rate calculator 82 generates the feed rate FR so there is an inverse relationship between the computed force and the feed rate FR. In the event the computed force is increased to implement the advancement of the energy applicator 24, feed rate calculator 82 reduces the feed rate FR. This reduction of feed rate FR reduces the likelihood that the manipulator will advance the energy applicator 24 at a speed above which the accuracy of the application of the energy applicator 24 to the tissue will be adversely affected. In some versions, the feed rate calculator 82, based on the magnitude of the computed force and reference to one of the look-up tables 84, determines a coefficient. This coefficient represents the extent to which the defined feed rate should be scaled as a function of the magnitude of the computed force.

A seventh variable that can employed by the feed rate calculator 82 to adjust the defined feed rate to generate the feed rate FR can be based on a virtual boundary 71 collision (VB COLLISION), as shown in FIG. 8. If the energy applicator 24 or tool 20 penetrates the virtual boundary 71, the defined feed rate FR can be adjusted. The collision can occur due to multiple factors, events, or conditions. In one example, the collision occurs due to commanded motion of the manipulator 14 (e.g., during the semi-autonomous or manual mode). For instance, in the manual mode, the user may apply an input force to the end effector which results in a commanded position that penetrates the boundary 71. Additionally, or alternatively, the collision can occur due to sources external to the manipulator 14. Such sources can be changes to the patient anatomy, patient movement, patient tracker(s) 54, 56 movement, or the like. For instance, one or more of the patient tracker(s) 54, 56 may move from its current position to a different position. Movement of the patient tracker(s) 54, 56 can be due to movement of the patient's anatomy. Movement of the patient can be due to staff repositioning the patient or can result because of a collision with the anatomy. For instance, the robotic manipulator or energy applicator 24 can collide with and push the patient anatomy. In other examples, the energy applicator 24 during manipulation of the anatomy can physically push the anatomy. There may be an inadvertent bump to the anatomy by staff. Movement of the patient tracker(s) 54, 56 can be relative to the bone/anatomy to which the patient tracker(s) 54, 56 are attached. In other words, rigid fixation of the patient tracker(s) 54, 56 to the anatomy can become dislodged, shifted, or loosened. In one instance, movement of the patient tracker(s) 54, 56 causes a corresponding movement of a virtual boundary 71 that is registered to the corresponding anatomy to which the patient tracker(s) 54, 56 is affixed. Movement of the virtual boundary 71 can collide with the manipulator 14 or energy applicator 24. In another instance, movement of the patient tracker(s) 54, 56 can cause a regeneration or update of the tool path TP or segments thereof. The regenerated or updated tool path TP or segment on which the energy applicator 24 is on may have a different defined feed rate as compared with the last feed rate that existed prior to movement of the patient tracker(s) 54, 56. A collision with the virtual boundary 71 can occur to any of the scenarios described herein and may occur based on other conditions not specifically described herein.

The defined feed rate FR can be adjusted in response any collision condition. Adjustment may be proactive or retroactive and the feed rate FR can be increased or decreased. The adjustment can occur as a precautionary measure (e.g., to slow down the energy applicator or tool) or to mitigate the current/expected effects of the collision. The collision can be resisted, complied with, or avoided by adjusting the feed rate FR. The feed rate FR can be increased to reach anatomy moving away from the energy applicator 24 or the feed rate FR can be decreased in response to anatomy moving towards the energy applicator 24. Other manners of adjusting the feed rate FR in response to collision of the virtual boundary 71 by the energy applicator 24/tool 20 are contemplated.

Two additional input variables that can employed by the feed rate calculator 82 to adjust the defined feed rate to generate the feed rate FR are the actual undesired orientational motion (Actual UOM) and expected undesired orientational motion (Expected UOM), as shown in FIG. 8. These inputs are described in detail in the subsequent section and are provided by the control algorithms which can determine, identify, or monitor actual or expected undesired orientational motion of one or more non-tool path components of the kinematic chain KC. These variables can be inputted to change the feed rate FR actively or proactively in order to mitigate undesired effects of the orientational motion. Techniques for identifying, calculating, monitoring undesired orientational motion are described in the next section.

Feed rate calculator 82 can multiply the defined feed rate by the above coefficients. The product of this process is the feed rate FR, the actual rate at which the energy applicator 24 should be advanced along the current path segment.

An additional input into feed rate calculator 82 can be a signal asserted from a force overrider (FIG. 8) module, also a component of the path generator 68. During semi-autonomous advancement of the energy applicator 24, a condition may occur that causes the surgeon to suddenly attempt to reposition the tool 20. When taking this action, the practitioner may inadvertently not release the pendant 88 trigger. Should this event occur, in response to the practitioner's efforts to displace the tool 20 away from the tool path TP, the force/torque sensor S is exposed to relatively high forces and torques. These forces and torques are above the high limit force/torque limits maintained by the force overrider module. The force overrider module is configured to output a signal to transition the manipulator 14 from said semi-autonomous mode to the manual mode. Force overrider also evaluates the output of the force-torque sensor S to determine if these forces/torques have exceeded their higher limit values for a time greater than the designated time period. If the above evaluation tests true, force overrider asserts commands that result in the deactivation of the instrument power generating unit. The force overrider can also assert commands that result in the stopping of the semi-autonomous advancement of the energy applicator 24. In response to the assertion of a signal from the force overrider, feed rate calculator 82 outputs a zero-speed feed rate FR. Often feed rate calculator 82 ramps the instrument to the zero-speed feed rate. Once the force overrider stops asserting the signal to the feed rate calculator 82, based on the input of other commands from the practitioner, the feed rate calculator 82 returns to outputting a nonzero speed feed rate FR.

A path interpolator (PATH INTRPLTR), as shown in FIG. 8, is another sub-module component of the path generator 68. Path interpolator 86 determines target positions for a coordinate system of the energy applicator 24. The pose of distal end of the energy applicator 24 is understood to be fixed relative to coordinate system of the energy applicator 24. These target positions are points along which the distal end of energy applicator 24 should travel to perform the task. Inputs into the path interpolator 86 include, but are not limited to: the data defining the origin and terminus of a path segment PS; the data indicating if the segment PS is straight or curved and, if curved, the characteristics of the curve. Another input into the path interpolator 86 is the feed rate FR from feed rate calculator 82. This is the rate at which the instrument should travel along the path segment as determined by the feed rate calculator 82. Based on the above input variables, the path interpolator 86 determines the target position of the distal end of the energy applicator 24 according to the following steps in one implementation: 1) The origin of coordinate system of energy applicator 24 is assumed to be at an initial position. The initial position is a position along the path segment PS over which the energy applicator 24 should travel. If the energy applicator 24 is at the beginning point of the segment PS, this point is the initial position of coordinate system of energy applicator 24. Both the initial position and the target position are points in the bone coordinate system. 2) Based on the feed rate FR, the distance along which the energy applicator 24 would travel along the segment PS in a single time frame is calculated. In some versions, the period of a time frame is 0.1 to 2 milliseconds. 3) Based on the initial position, the length of the calculated distance and the location of the segment terminus, path interpolator 86 generates data defining the target position. A further variable used to determine target positions are data from the tool path generator describing the characteristics of the path segment: straight or curved; and, if curved, the radius of curvature. 4) Steps 1 through 3 are repeated until it is determined that the coordinate system EAPP has reached the terminus of the path segment. After the calculation of the first target position spaced from the segment origin, the target position calculated in each frame is employed as the initial position upon which the calculation of the next frame's target position is based. 5) Once the target position equals the terminus position for a path segment PS, path interpolator 86 repeats steps 1 through 4 to generate a set of target positions that are located along the new segment.

During the time period of a single frame, the distance the energy applicator 24 can travel may be greater than the distance to the terminus position for the current segment. If the path interpolator 86 determines that the energy applicator 24 would be in this state, the interpolator, for a time point starting when it is determined that the energy applicator 24 would be at the terminus of the current path segment, generates data indicating where the energy applicator 24 should be located at along the next path segment at the end of that frame.

Once the practitioner is ready to begin semi-autonomous advancement of the tool 20, the practitioner utilizes a remote control or pendant 88, as shown in FIG. 1. The practitioner can depress buttons 90*a*, 90*b* of the pendant 88. In some versions, the one or more controllers, based on the depression of buttons 90, outputs a coefficient representative of the user adjustment of the feed rate FR. In some versions, the coefficient is 0.0, 0.25, 0.40, 0.70 or 1.0. This is the coefficient that is applied to feed rate calculator 82 as the USER ADJUST input, as shown in FIG. 8. Each depression of pendant button 90*a* results in readjusting the feed rate coefficient up to the next higher level. Each depression of pendant button 90*b* results in readjusting the feed rate coefficient down a level. The one or more controllers monitor the pendant 88 to determine whether either of buttons 90 is depressed. A command to start instrument advancement may be a command to reset the USER ADJUST coefficient to above 0.

There is no requirement that in all versions the feed rate calculator 82 always calculate the feed rate FR based on the instantaneous values of the variables. In some versions, these input variables may be filtered. Likewise, there may be reasons to vary the coefficients that are used as the multipliers to establish the extent any variable effects feed rate FR. The application of a particular variable may be delayed. The varying of the coefficient may be filtered or ramped to blend in/out the effect of the change in the magnitude of the coefficient. This filtering or blending results in a smoothing out of the advancement of the tool 20. This smoothing out of the advancing of the instrument may reduce the likelihood that, owing to rapid changes in the positioning of the instrument, the manipulator may become unstable or overshoot the target position. The effect of any variable may be selectively disregarded. For example, it may be desirable to generate the feed rate FR based on either the smallest or largest coefficient while the other coefficients are disregarded.

In some versions, two or more variables into feed rate calculator 82 may be combined. This combining may be by summing, multiplying, averaging, or dividing. The calculated coefficients may likewise be summed, multiplied, averaged, or divided to provide a final coefficient used to, based on the defined feed rate, establish the feed rate FR.

Likewise, there is no requirement that the coefficients may be determined solely on the basis of a variable-to-coefficient feed rate table. Other means to determine these coefficients are based on using the variables as input variables into an equation the result of which is the coefficient used to establish the feed rate FR. The equations may be polynomial equations or non-linear equations.

Likewise, data other than instrument current draw may be used as the data by the feed rate calculator 82 that serves as the indicia of instrument power. These data include, the voltage or duty cycle required to be applied to the instrument to maintain a constant output. This output may be speed or temperature. In the case of a closed loop energy output device, the measurement of the output can serve as the indicia of instrument power. More specifically, a drop of the output can serve as the indicia of a change in instrument power. For example, if the sensed parameter is motor speed, a drop in speed indicates there was an increase in the power demand of the instrument. Based on this inferential indication that power demand has changed, the INST POWER coefficient applied to the feed rate calculator 82 is adjusted.

III. Techniques for Changing Feed Rate to Account for Undesired Orientational Movement of Non-Tool Path Components of Kinematic Chain As described in the previous section, the feed rate FR can be set and changed based on various conditions and/or variables. As described in this section, the feed rate FR can be changed to account for undesired orientational motion of non-tool path components of the kinematic chain KC. Here, non-tool path components is a term used described those components of the kinematic chain KC, such as the manipulator 14, the base 16, links 18, joints J, end effector 22, tool shaft 33 (if applicable), mounting system and/or sterile interface mechanism, that are not located on (located off) the tool path TP. In other words, non-tool path components include any components of the kinematic chain KC excluding the energy applicator 24, which is located on the tool path TP. Because undesired orientational motion to be mitigated is for non-tool path components of the kinematic chain KC, changing of the feed rate FR to account for undesired orientational motion can even occur when a segment PS of the tool path TP along which the energy applicator 24 is advancing is linear. As will be described below, there are a variety of circumstances that influence presence or expected presence of undesired orientational motion, and such circumstances can exist whether the tool path TP is linear or curved at the time of mitigation.

The one or more controllers 26, 68, 82 are configured to identify that one or more components of the kinematic chain KC other than the energy applicator 24 (non-tool path components of the kinematic chain KC) is either experiencing or will experience an undesired orientational motion. In other words, the one or more controllers 26, 68, 82 can determine that undesired orientational motion is actively and presently occurring or is expected to occur. In either scenario, the one or more controllers 26, 68, 82, in response, change the feed rate FR of the energy applicator 24 to account for the undesired orientational motion.

A. Undesired Orientational Motion and Effects

The term "undesired" with respect to orientational motion describes a non-tool path kinematic motion, whether intentional or not, that the system 10 is configured to determine or identify as one that should be eliminated or mitigated by the system 10 because such motion is unwanted for reasons related to either system performance or user experience. The term "orientational" with respect to motion can be understood as angular in nature, e.g., rotational motion of the non-tool path components. Orientational motion can be, but need not necessarily be, along a circular path. Instead, the undesired orientational motion can be motion along any curved path in two or three dimensions. Here, "path" merely describes a path of movement taken by any non-tool path component of the kinematic chain KC and does not necessarily mean (but can include) a predefined path of motion. The term "motion" in regard to orientational can be defined as undesired one or more of an: angular velocity, angular acceleration, or angular jerk experienced by or that will be experienced by any one or more components of the kinematic chain KC other than the energy applicator 24. The term "motion" excludes static position or displacement of the non-tool path components, but instead includes rate of change of position over time, or any derivate thereof.

Because the non-tool path components described herein exclude the energy applicator 24, the undesired orientational motion described herein explicitly excludes rotation of the energy applicator 24, such as rotation of the cutting bur 25 about its cutting axis. Orientational motion excludes linear motion of the non-tool path components of the kinematic chain KC. Orientational motion also excludes motion which is commanded strictly by position (x, y, z), as compared with motion which is commanded by at least some orientation (e.g., rotation about x, y, z axes). This orientational motion could be in addition to or exclusive from positional commanded motion. For example, the commanded positions CP define the (x, y, x) position of the TCP relative to the tool path TP and do not define orientational poses or movement of the non-tool path components as such are orientational poses are dictated by the inverse-kinematic solution. Hence, the commanded positioning of the energy applicator 24 along the tool path TP, regardless of whether the path segment PS is linear or curved, is desired positional motion and is not undesired orientational motion.

Accounting for the undesired orientational motion, in some implementations, means that the feed rate FR is changed to mitigate undesirable effects of the orientational motion. For example, the undesired orientational motion may cause one or more components of the kinematic chain KC other than the energy applicator 24 to make an abrupt turning motion. In some instances, the abrupt turning motion may increase the likelihood of a potential unintended collision between the non-tool path components and another object. Mitigation of the undesired orientational motion by changing the feed rate FR can decrease the likelihood of such collisions. Additionally, abrupt turning motion of the non-tool path components can create unintended shaking of the manipulator 14, which in turn, may cause inaccuracies to the commanded positions of the energy applicator 24 relative to the tool path TP or surgical site. Mitigation of the undesired orientational motion by changing the feed rate FR can decrease the likelihood of such inaccuracies. Furthermore, the abrupt turning motion may appear to the practitioner as visually concerning. Mitigation of the undesired orientational motion by changing the feed rate FR provides a smoother, more consistent motion of the non-tool path components thereby improving user experience.

B. Changing the Feed Rate to Account for Undesired Orientational Motion

Changing the feed rate FR to account for the undesired orientational motion may occur by the one or more controllers 26, 68, 82 changing the actual feed rate FR or the defined feed rate, described in the previous section. The variables (Actual UOM) and (Expected UOM) in FIG. 8 can be inputted directly into the feed rate calculator 82 along with any of the other variables in order to output the feed rate FR to the path interpolator 86.

In another implementation, input from variables (Actual UOM) and (Expected UOM) can bypass the feed rate calculator 82 and instead be inputted into the path interpolator 86 to thereby override the feed rate outputted by feed rate calculator 82, as shown by dashed lines in FIG. 8. This overriding may be beneficial to ensure that the undesired orientational motion is mitigated, such as in situations where the other feed rate variables may dictate otherwise. When undesired orientational motion is identified, such feed rate overriding may be a default setting or an exception for certain circumstances. The one or more controllers 26, 68, 82 can determine when a feed rate override condition exists based on any suitable criteria or condition, such as, but not limited to: an exceeding of a threshold (e.g., magnitude, direction, duration) related to the undesired orientational motion, a stage of a surgical procedure, surgeon preferences related to tolerance of undesired orientational motion, identified presence of any conditions that may cause undesired orientational motion (shown in FIG. 14), any factor related to the tool path TP or segment, the value of the feed rate outputted by the feed rate calculator 82, or the input values of any of the variables described above used in computing the feed rate.

In some implementations, the one or more controllers 26, 68, 82 are configured to model the tool 20 and the energy applicator 24 as the virtual rigid body and change the feed rate FR to account for the undesired orientational motion based on the virtual force applied to the virtual rigid body. As such, parameters related to undesired orientational motion or input from variables (Actual UOM) and (Expected UOM) can be included in the virtual force, which can be the computed force (CMPTD FORCE) variable described above.

In some implementations, the one or more controllers 26, 68, 82 change the feed rate FR to account for the undesired orientational motion by further being configured to reduce the feed rate FR. In one example, the feed rate FR is reduced by a factor correlated to a magnitude and/or direction of the undesired orientational motion experienced by or that will be experienced by the one or more components of the kinematic chain KC other than the energy applicator 24. In some implementations, the changed feed rate FR is a non-zero velocity that is less than the velocity of the feed rate existing before change of the feed rate. In other words, the existing feed rate FR can be reduced to mitigate the undesired orientational motion. The change or reduction may be gradual or impulsive and can occur over, or for, any duration, such as the duration determined by the one or more controllers 26, 68, 82 required to mitigate the undesired orientational motion.

In some instances, the one or more controllers 26, 68, 82 can mitigate the undesired orientational motion by additionally, or alternatively, increasing the feed rate FR or deliberately maintaining an existing/predetermined feed rate FR that was otherwise planned to increase. For example, the one or more controllers 26, 68, 82 may rapidly decrease the feed rate FR, then increase the feed rate FR to mitigate the undesired orientational motion.

Figures 10, 11:
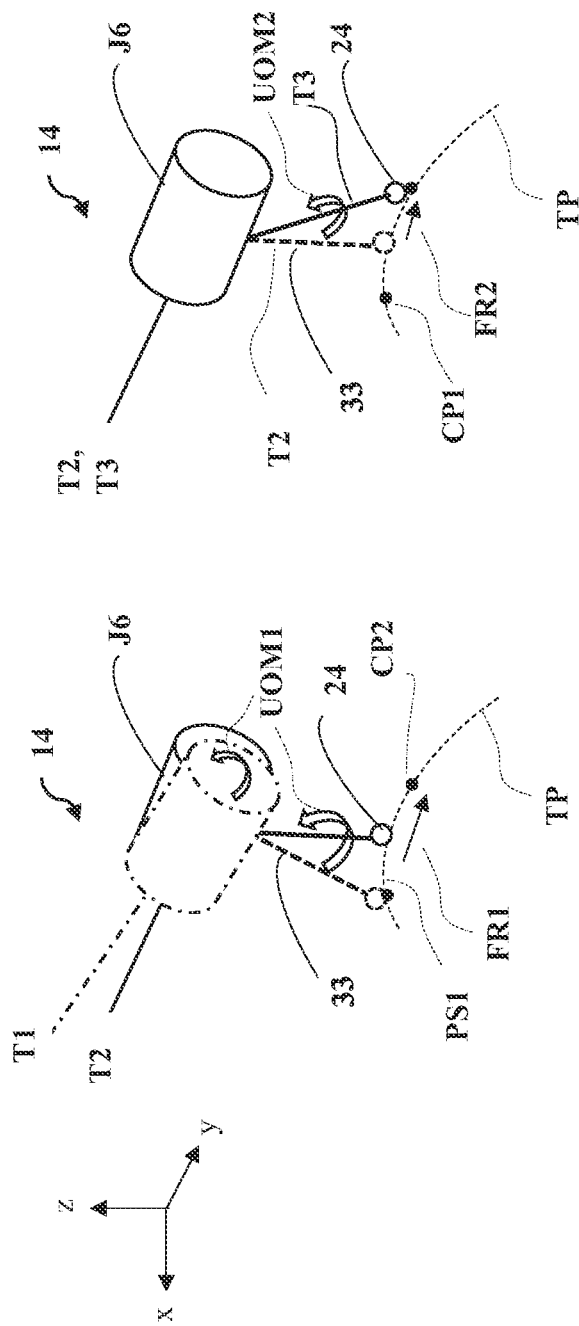
FIG. 10 schematically illustrates an example of certain non-tool path components of the kinematic chain experiencing undesired orientational motion, occurring, for instance, based on advancement of the energy applicator according to a defined feed rate.
FIG. 11 schematically illustrates reduction of the feed rate of the energy applicator of FIG. 10, prior to the energy applicator reaching the next commanded position, to mitigate undesired orientational motion of the certain non-tool path components, according to one implementation.

One example of undesired orientational motion of a non-tool path component of the kinematic chain KC is shown in FIGS. 10 and 11. In this example, the non-tool path component of the kinematic chain KC that experience undesired orientational motion are the shaft 33 of the tool 20 and one joint J of the manipulator 14. In FIG. 10, the energy applicator 24 is advanced along a curved path segment PS1 between commanded positions CP1 and CP2. During this motion, the one or more controllers 26, 68, 82 identify or predict that the tool shaft 33 and joint J6 experience or will experience undesired orientational motion UOM1 as a result of advancement pursuant to the feed rate FR1. The state of the joint J6 and tool shaft 33 are represented by dashed lines at time step T1 and in solid lines at subsequent time step T2. The undesired orientational motion UOM1 results in abrupt turning (shown by arrows) of the tool shaft 33 and joint J6 between T1 and T2. In one example, the undesired orientational motion UOM1 of the tool shaft 33 and joint J can be determined using any of the methods that will be described herein, including by evaluating the angular motion of the shaft 33 and joint J relative to a respective previous position of the component and/or relative to any other component of the manipulator 14. The undesired orientational motion can also be identified relative to datum references which may or may not experience undesired orientational motion, such as the energy applicator 24, tool path TP and/or commanded positions PS.

In FIG. 11, to mitigate the undesired orientational motion, the one or more controllers 26, 68, 82 change the feed rate FR1 to a different feed rate FR2. In FIG. 11, the state of the tool shaft 33 is represented by dashed lines at time step T2 and in solid lines at subsequent time step T3. The feed rate FR2 is changed while the energy applicator 24 traverses the same path segment PS1. Intentionally changing the feed rate to FR2, in turn, causes undesired orientational motion UOM2 of both the tool shaft 33 and joint J6 to be reduced or eliminated before reaching the commanded position CP2.

Figure 13:
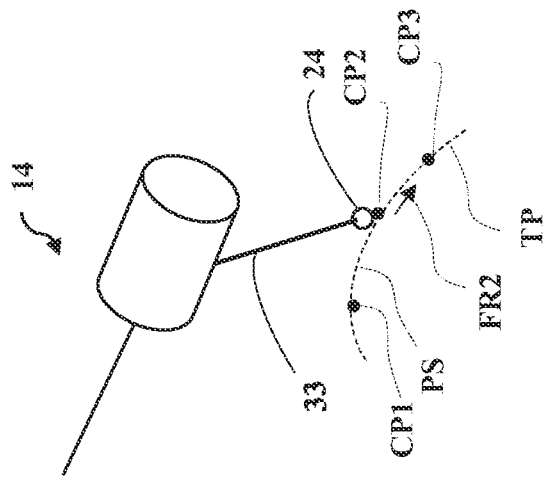
FIG. 13 schematically illustrates reduction of the feed rate of the energy applicator of FIG. 12, after the energy applicator reaches the next commanded position, to mitigate the undesired orientational motion of the certain non-tool path components, according to one implementation.
Figure 12:
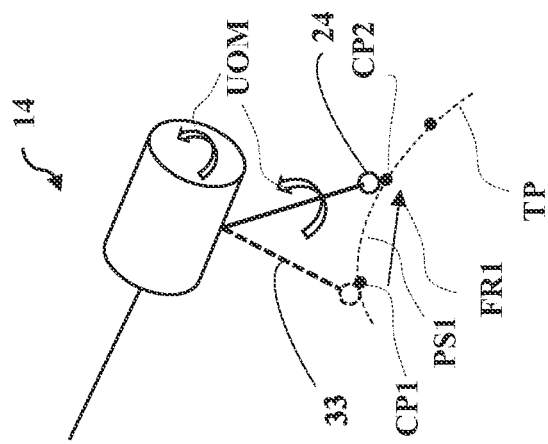
FIG. 12 schematically illustrates another example of certain non-tool path components of the kinematic chain experiencing undesired orientational motion, occurring, for instance, based on advancement of the energy applicator according to a defined feed rate.

In the previous example of FIGS. 10 and 11, the feed rate FR was changed to account for undesired orientational motion UOM in the process of the energy applicator 24 traversing one path segment PS. In FIGS. 12 and 13, another example is shown to mitigate the undesired orientational motion UOM by changing the feed rate FR after the energy applicator completes traversal of a path segment PS1 and reaches the next commanded position CP2. In other words, the undesired orientational motion occurs on path segment PS1 between CP1 and CP2 but is mitigated on the next path segment between CP2 and CP3 due to changing of the feed rate from FR1 to FR2. The subsequent commanded position CPN may be determined before or after changing the feed rate FR.

These examples illustrate reactive adjustment of the feed rate FR occurring after the undesired orientational motion occurs. The feed rate FR modification to account for undesired orientational motion can alternatively be predictive, such that the non-tool path components of the kinematic chain KC do not experience (or fully experience) undesired orientational motion since the system 10 will proactively mitigate the same.

C. Undesired Orientational Motion—Influencing Factors and Examples

Figure 14:
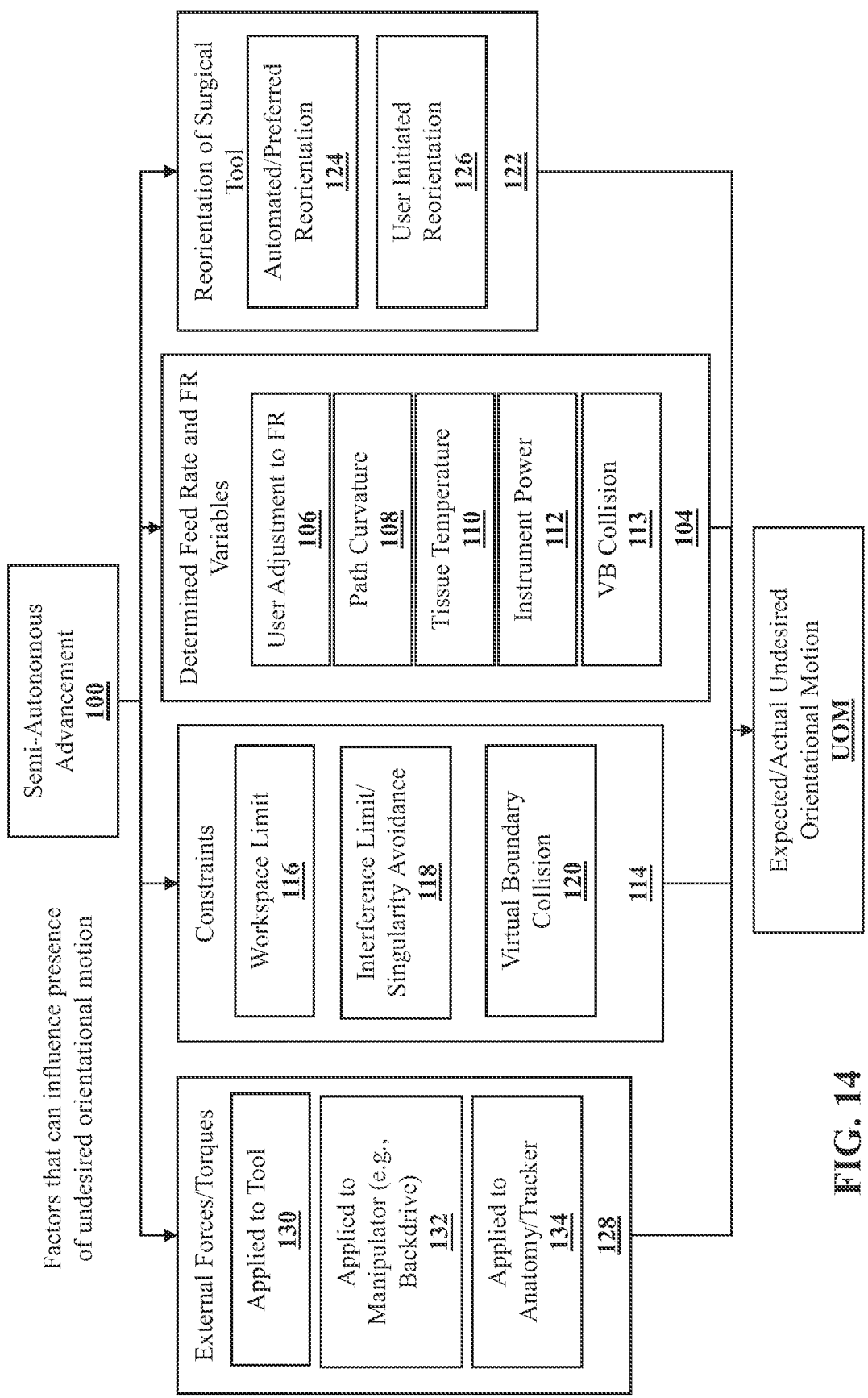
FIG. 14 is a block diagram of factors influencing presence or expected presence of undesired orientational motion of non-tool path components of the kinematic chain.

With reference to FIG. 14, the undesired orientational motion (shown at UOM) occurs or is expected to occur responsive to, during, or based on one or more present or expected external conditions, scenarios, or actions. Such factors can occur because of the manipulator 14 itself, the surgical environment, or the user. Whether individually, or in combination, such conditions, scenarios, or actions can be direct or indirect factors influencing presence or expected presence of the undesired orientational motion.

In one implementation, for any present or expected external conditions, scenarios, or actions, the undesired orientational motion occurs or is expected to occur during advancement of the energy applicator 24 in the semi-autonomous mode, as shown at 100 in FIG. 14. This is based on the understanding that the system 10 typically implements a controlled feed rate in the semi-autonomous mode to move the energy applicator 24 along the tool path TP. Undesired orientational motion can occur in other modes of operation, such as the manual mode. For example, the manipulator 14 and/or end effector 22 can be equipped with a feed rate controller interface or pendant which enables the user to manually control the feed rate of the tool along, for example, an insertion axis. In such scenarios, the undesired orientational motion may occur even when the user manually controls the feed rate, e.g., in a manual mode. One example of manual feed rate control is described in US Patent Application Publication No. 2020/0289133A1, entitled "Robotic Surgical System and Methods Utilizing a Cutting Bur for Bone Penetration and Cannulation" the contents of which are incorporated by reference herein in their entirety.

i. Determined Feed Rate and Variables

One factor that can influence presence or expected presence of the undesired orientational motion is the advancement of the energy applicator 24 according to the feed rate FR or variables utilized in calculation of the feed rate FR shown at 104 in FIG. 14, and as described in the previous section. In this scenario, the one or more controllers 26, 68, 82 advance the energy applicator 24 to commanded positions CP along the tool path TP according to the feed rate FR. Due to this feed rate advancement, it is conceivable that the inverse-kinematic solutions may cause one or more of the non-tool path components of the kinematic chain KC to experience undesired orientational motion. Presence or expected presence of the undesired orientational motion can be influenced by any of the following based on an understanding that such feed rate adjustment factors have consequences to orientational motion of the non-tool path components: the user adjustment 106 to the feed rate FR (USER ADJUST), for example by using the pendant 88; path curvature 108 (PATH CRVTR); tissue temperature 110 (TISSUE TEMP), instrument power 112 (INST. POWER), and/or a collision with the virtual boundary 113 (VB COLLISION). The example shown in FIGS. 10 and 11 and FIGS. 12 and 13, respectively, can be regarded as illustrating undesired orientational motion occurring based on the advancement of the energy applicator 24 according to the feed rate FR or variables utilized in calculation of the feed rate FR.

ii. Constraints

Another factor that can influence presence or expected presence of the undesired orientational motion are constraints (shown at 114) on or of the system 10. Such constraints can be mechanical constraints and/or virtual constraints involved with any component of the kinematic chain KC. These constraints, individually, or in combination, can influence undesired orientational motion.

One constraint that can influence presence or expected presence of the undesired orientational motion is a workspace limit constraint, shown at 116 in FIG. 14. As part of the motion control processes performed by the manipulator controller 26, a workspace limit is evaluated to determine if the energy applicator 24 is reaching the boundary of a defined workspace. The limit of this workspace is spaced from the origin of the coordinate system MNPL and is defined by reference to this coordinate system. The workspace is within the volume in which energy applicator 24 can move if the links 18 can move to the full extensions of their ranges of motion. This workspace, sometimes referred to as the "dexterous workspace," and the manipulator 14 prohibits the energy applicator 24 to advance outside of this workspace. The workspace limit can have any geometrical shape and is typically less than the volume of the space within the full range of motion of the manipulator 14, for example, to ensure that the practitioner has at least some ability to so reorient the end effector 22. In the process of respecting this workspace limit, it is conceivable that the one or more of the non-tool path components of the kinematic chain KC will experience an undesired orientational motion by a corrective reorientation.

Another constraint that can influence presence or expected presence of the undesired orientational motion is an interference limit constraint, shown at 118 in FIG. 14. Here, the manipulator controller 26 controls the manipulator 14 to avoid collision between links 18 or any structural member of the manipulator 14. One reason to prevent these collisions is to prevent the relative movement of the links 18 that could result in pinch points forming between the links 18. Preventing these collisions also avoids the damage caused by such collisions. Based on the representations of the actual joint angles, the manipulator controller 26 determines a minimum distance between pairs of potentially colliding links 18. To make this determination, the manipulator controller 26 can use forward kinematics data to determine the pose of the joints J, and common normal distances and minimum distances between pairs of potentially colliding links 18. The manipulator controller 26 calculates a difference between the minimum distance for pairs of potentially colliding links 18 and a boundary distance for the pair of links 18. This boundary distance is the distance below which movement of the links 18 towards each other is undesirable. In the process of respecting this interference limit, it is conceivable that the one or more of the non-tool path components of the kinematic chain KC will experience an undesired orientational motion by a corrective reorientation.

Another constraint that can influence presence or expected presence of the undesired orientational motion is constraint involved with singularity avoidance, also shown at 118 in FIG. 14. A singularity is a condition caused by the collinear alignment of two or more robot links or joints J resulting in unpredictable robot motion and velocities. When axes or joints J are placed at a singularity, there may be an infinite number of ways for the inverse kinematics to achieve the same position for the TCP. To avoid this condition, manipulator controller 26 can implement one of many control techniques. In one example, the interference limits described above can be implemented. In another example, singularity analysis can be performed during robot assembly or calibration. The analysis can yield singularity avoidance data which is stored to the manipulator controller 26. In response to an approaching singularity, the manipulator controller 26 can command the manipulator 14 to take corrective action, such as proactively rotating in certain joints J from singular straight posture. Corrective action can also occur by changing joint J position within a null space wherein joints J can be moved without changing the TCP position. The trajectory or orientation of the end effector 22 can also be modified to avoid the singularity. In the process of avoiding singularities, it is conceivable that the one or more of the non-tool path components of the kinematic chain KC will experience an undesired orientational motion by a corrective action.

Another constraint that can influence presence or expected presence of the undesired orientational motion is virtual constraint, shown at 120 in FIG. 14. For example, the virtual constraint can be one implemented by the boundary generator 66, which may define, for example, the virtual object or boundary 71 for constraining movement and/or operation of the tool 20, energy applicator 24, and/or manipulator 14. As described in the previous section, such virtual boundaries 71 may be defined with respect to an anatomical model AM, such as a 3-D bone model. The manipulator controller 26 and/or the navigation controller 36 track the state of the tool 20 relative to the virtual boundaries 71. In one example, the state of the TCP is measured relative to the virtual boundaries 71 for purposes of determining haptic forces to be applied to a virtual rigid body model via the virtual simulation so that the respective kinematic component remains in a desired positional relationship to the virtual boundaries 71 (e.g., not moved beyond them). The results of the virtual simulation are commanded to the manipulator 14. In the process of respecting such virtual boundaries 71, it is conceivable that the one or more of the non-tool path components of the kinematic chain KC will experience an undesired orientational motion by a corrective haptic or reactive force.

Figure 16:
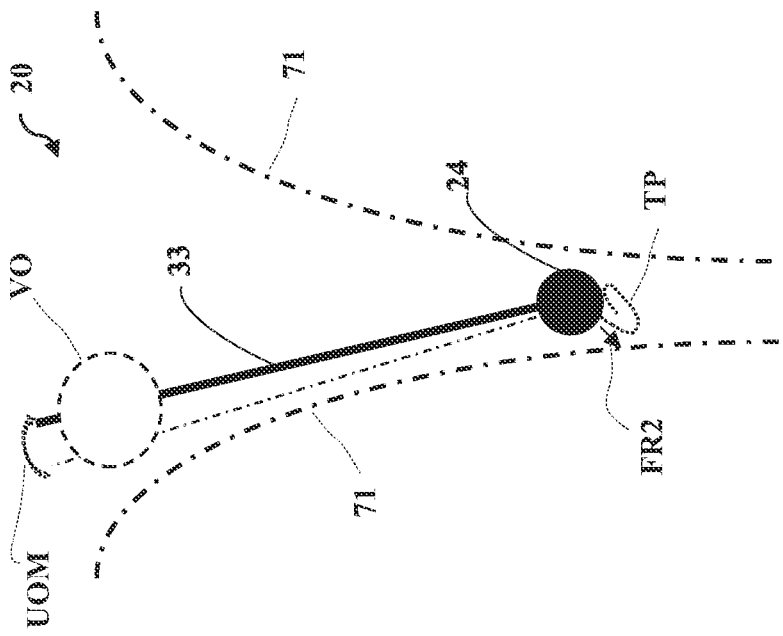
FIG. 16 schematically illustrates an undesired orientational motion experienced by the shaft of FIG. 15 responsive to the reactive force from the boundary collision and reduction of the feed rate to mitigate the undesired orientational motion, according to one implementation.
Figure 15:
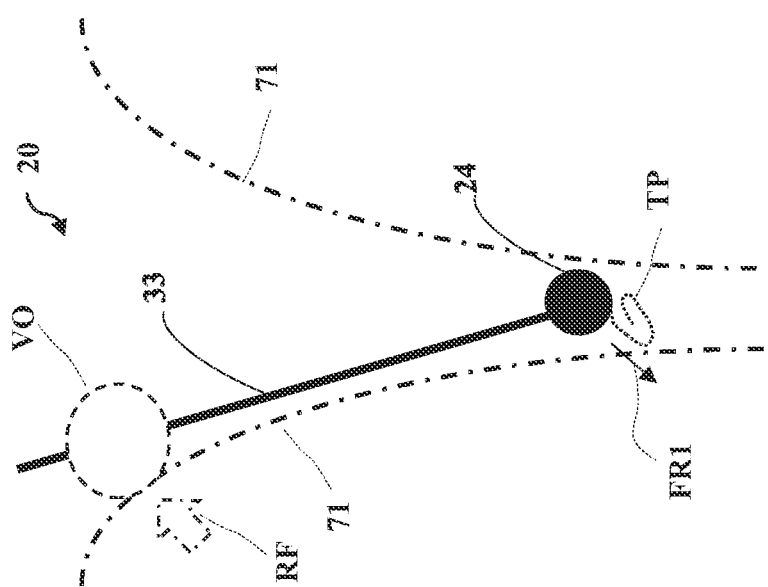
FIG. 15 schematically illustrates an example of a shaft of the tool comprising a virtual haptic object associated with the shaft wherein a reactive force is produced in response to collision between the virtual haptic object and a virtual boundary.

FIGS. 15 and 16 illustrate an example of non-tool path components of the kinematic chain KC experiencing an undesired orientational motion by a corrective haptic or reactive force from a constraint collision. More specifically, in this example, the non-tool path component is the shaft 33 of the tool 20 and the constraint is a virtual boundary 71. The virtual boundary 71 in this example can be associated with the anatomical model AM, for example, associated with femoral shaft for total hip surgery. The virtual boundary 71 delineates a volume of the femoral shaft to be removed by milling with the energy applicator 24 from regions of the femur that should not be removed. The energy applicator 24 follows the tool path TP within the virtual boundary 71. Specifically, the energy applicator 24 is advanced along the tool path TP according to a first feed rate FR1.

The one or more controllers 26, 68, 82 can associate one or more virtual haptic objects VO relative to the one or more components of the kinematic chain KC. In this example, the virtual haptic objects VO are associated with the shaft 33, but can be associated with any other component of the kinematic chain KC. The virtual haptic objects VO are not visually and physically present on the shaft 33, but instead are virtual, i.e., computationally related to the geometry of the shaft 33.

In some implementations, the one or more controllers 26, 68, 82 can associate a first virtual haptic object VO relative to a first component of the kinematic chain KC at a first location on the first component. The one or more controllers 26, 68, 82 may also associate a second virtual haptic object VO relative to the first component of the kinematic chain KC at a second location on the first component that is spaced apart from the first location. The virtual haptic objects VO can be located on any component of the kinematic chain KC, such as relative to one or more links 18, joints J, base 16, end effector 22, shaft 33, or the like. In one example, as shown in FIG. 15, the virtual haptic object VO is disposed near a proximal end of the shaft 33 because potential for undesired orientational motion of the shaft 33 is greater near the proximal end of the shaft 33 than the distal end of the shaft 33 where the energy applicator 24 is located.

The one or more controllers 26, 68, 82 can detect a collision between the one or more virtual haptic objects VO and the virtual boundary 71, as shown in FIG. 15. In one implementation, collision detection can be based on tracking of the anatomy and tool 20 by the navigation system, as described above. A magnitude and/or direction of collision can be detected and measured based on intersection between the virtual haptic object(s) VO and polygonal elements of the mesh of the virtual boundary 71 using any suitable technique, such as depth of penetration of the virtual haptic object with the boundary 71. Alternatively, the collision can be computed based on a penetration factor being a function of a geometry of the virtual volume bound relative to a geometry of the mesh polygonal element, such as using a projected arc or projected area method described in U.S. Patent Application Publication No. 2018/0353253A1 entitled "Robotic Surgical System and Method for Producing Reactive Forces to Implement Virtual Boundaries", the contents of which are incorporated by reference herein. In response to the collision, the one or more controllers 26, 68, 82 control the manipulator 14 to constrain the shaft 33 from exceeding the virtual boundary 71. Specifically, a reactive force RF based on a computed magnitude and/or direction of collision is commanded to the manipulator 14. The reactive force RF and its respective direction are shown at FIG. 15 by an arrow near the collision location.

In FIG. 16, the example illustrates that commanded motion of the manipulator 14 pursuant to the reactive force RF to avoid/mitigate the collision causes the undesired orientational motion UOM of the shaft 33. Again, the one or more controllers 26, 68, 82 can identify that the shaft 33 is either currently experiencing or will experience the undesired orientational motion UOM. The one or more controllers 26, 68, 82 change the feed rate from FR1 to FR2 to account for the undesired orientational motion UOM occurring responsive to constrain the shaft 33 in response to the detection of the collision.

The example shown in FIGS. 15 and 16 is not intended to limit the scope of the description in regard to how the non-tool path components of the kinematic chain KC experience an undesired orientational motion by constraint nor how the one or more controllers 26, 68, 82 can account for such undesired orientational motion. For example, non-tool path components other than the shaft 33 may be subject to any type constraints, such as those described above. The constraint also need not necessarily require a collision, such as with virtual haptic objects VO, but may instead be based on computational control of motion limits. For instance, the shaft 33 may collide with the virtual boundary 71 without virtual haptic objects VO being present. The one or more controllers 26, 68, 82 can detect the collision based on a model of the known physical geometry of the shaft 33.

iii. Tool Reorientation

Another factor that can influence presence or expected presence of the undesired orientational motion are reorientations of the surgical tool 20 and/or end effector 22, shown at 122 in FIG. 14. Such reorientations can be during advancement of the energy applicator 24 along the tool path TP or can occur when the energy applicator 24 is stationary.

In one instance, reorientation of the surgical tool 20 and/or end effector 22 can be initiated by the system 10. For example, as shown at 124, the reorientation can be an automated reorientation that is performed by the manipulator controller 26. The automated reorientation in one example can be reorientation to a preferred orientation determined by the system 10 to be optimal or preferable for a given scenario, condition, or stage of a surgical procedure.

In instances where the energy applicator 24 advances along the tool path TP, the automated reorientation can occur in response to system preferences for approaching the surgical site and/or reorientation forces and torques applied to the surgical tool 20 and/or energy applicator 24 by obstructions near the surgical site. In practice, there may be an obstacle that blocks advancement of the energy applicator 24 along the path segment PS. This obstacle might be a protruding tissue or a surgical instrument. To prevent the obstacle from blocking the advancement of the energy applicator 24, the tool 20 may need to assume a different orientation or an orientation outside of the normal range of orientations.

In one implementation, automated reorientation can be implemented as follows. By knowing the actual pose of the tool 20, an orientation regulator of the manipulator controller 26 can define a reference surface (e.g., plane) that is located above (e.g., 5-20 cm above) the energy applicator 24 with the reference surface being perpendicular to the longitudinal axis of the tool 20. The orientation regulator then defines an aperture (e.g., circle) in the reference surface centered around the point where the longitudinal axis of the tool 20 intersects the reference surface. The aperture can define the limits of normal orientation of the tool 20. Orientation regulator may determine that the tool 20 orientation has moved or may need to move to a pose within or beyond the aperture limits. In response, the manipulator controller 26 can command a force to the manipulator 14 to reorient the tool within or beyond the aperture. In the process of implementing automated reorientation, it is conceivable that the one or more of the non-tool path components of the kinematic chain KC will experience an undesired orientational motion.

In another instance, reorientation of the surgical tool 20 and/or end effector 22 can be initiated by the user, as shown at 126 in FIG. 14. In one example, the practitioner may decide to reset the orientation of the tool 20 while the energy applicator 24 is advanced along the tool path TP. It may be desirable to so reorient the tool 20 to avoid contact with tissue or another instrument that may be in the vicinity of the tool path TP. If the practitioner wants to so reorient the tool 20, he/she actuates an input on the end effector 22. Alternatively, the practitioner may attempt to implement the reorientation of the tool 20 by force, without inputting any command. The manipulator controller 26 can monitor this user input, for example, by monitoring duration of user input or based on forces detected by the force/torque sensor S. In either case, the manipulator controller 26 can command the manipulator 14 to reorient to the tool 20 in a manner emulating the corresponding user input. In the process of implementing manual reorientation, it is conceivable that the one or more of the non-tool path components of the kinematic chain KC will experience an undesired orientational motion. Examples of the automated or manual robotic control of tool reorientation can be like those described in U.S. Pat. No. 9,119,655, entitled, "Surgical Manipulator Capable of Controlling a Surgical Instrument in Multiple Modes," and U.S. Pat. No. 9,937,014, entitled "System and Method of Controlling a Surgical Tool During Autonomous Movement of the Surgical Tool", the disclosure of each of which are hereby incorporated by reference.

FIGS. 17 and 18 illustrate an example of non-tool path components of the kinematic chain KC experiencing an undesired orientational motion in response to reorientation of the manipulator 14, and more specifically, the tool 20. More specifically, the reorientation in this example can be initiated by the practitioner either applying force to the distal joint (J) (as shown), or by actuating a user input on the end effector 22 (not shown). During the reorientation action shown in FIG. 17, the energy applicator 24 is advanced along the tool path TP according to a first feed rate FR1. In FIG. 17, the example illustrates that motion of the manipulator 14 pursuant to the reorientation command causes the undesired orientational motion UOM of the shaft 33 and joint J. Again, the one or more controllers 26, 68, 82 can identify that these components are either currently experiencing or will experience the undesired orientational motion UOM. The one or more controllers 26, 68, 82 change the feed rate from FR1 to FR2 to account for the undesired orientational motion UOM occurring responsive to the reorientation.

The example shown in FIGS. 16 and 17 is not intended to limit the scope of the description in regard to how the non-tool path components of the kinematic chain KC experience an undesired orientational motion by reorientation nor how the one or more controllers 26, 68, 82 can account for such undesired orientational motion.

iv. External Forces

Yet another factor that can influence presence or expected presence of the undesired orientational motion are external forces or torques, shown at 128 in FIG. 14. Such external forces can occur during advancement of the energy applicator 24 along the tool path TP or can occur when the energy applicator 24 is stationary. These external forces and torques can include the resistance of the tissue to tool 20 advancement and external forces and torques applied to any one or more components of the kinematic chain KC, e.g., by the practitioner or environment. The motion control modules can monitor the state of the manipulator 14 to detect if external forces/torques are being applied to or objects are in contact with the manipulator 14 or tool 20.

One example of an external force/torque that can influence presence or expected presence of the undesired orientational motion is an external force/torque applied to the tool 20, shown at 130. In one example, this external force/torque is applied to the tool 20 by the practitioner manually reorienting the tool 20 by force or by user input, as described above and as shown in FIGS. 17 and 18. Such external forces can be detected by the force/torque sensor S. Manipulator controller 26 can also monitor signals representative of the forces and torques sensed by force/torque sensor S to determine if excessive external forces are being applied to the tool 20 or energy applicator 24. As a result of the normal resistance of the tissue to which the energy applicator 24 is applied, there is some resistance to the advancement of the tool 20. During semi-autonomous advancement of the tool 20, the force/torque sensor S, in response to the application of the tissue resistance, may output signals indicating that the sensor is being exposed to a level of forces and torques beyond an appreciable limit. In the process of commanding the manipulator 14 to account for external forces/torques on the tool 20, it is conceivable that the one or more of the non-tool path components of the kinematic chain KC will experience an undesired orientational motion.

Another example of an external force/torque is a backdrive of the manipulator 14, shown at 132. Backdrive torques are output by joint motors 27 in response to external forces and torques placed on the manipulator 14, tool 20 and/or energy applicator 24. The backdrive torques are the torques output by the joint motors 27 beyond the torques needed to overcome inertia and the force of gravity. When the manipulator 14, tool 20 and/or energy applicator 24 are subjected to external forces and torques, these forces and torques momentarily disrupt the advancement of the tool 20 to the commanded pose. This, in turn, momentarily disrupts the advancement of one or more of the joints J to their commanded joint angles. Control loops simultaneously with the application of the external forces and torques, adjust the torques output by the joint motors 27 to compensate for these external forces and torques. To calculate the backdrive torques, the manipulator controller 26 can determine the torques that joint motors 27 should output if external forces and torques are not present. The manipulator controller 26 can be utilized measured joint angles from encoders and calculated joint angles from forward kinematics analysis. Further variables upon which the backdrive torques can be determined are the actual torques that the joint motors 27 apply to the links 18 to advance the tool 20, and hence, energy applicator 24, towards the commanded pose. One method of obtaining actual torques is the measuring of the torques output by the joint motors 27, more accurately, the reduction gears. Another method is to monitor the torques the joint motors 27 output as measured by torque sensors or sensors measuring electrical current draw of the joint motors 27. In the process of controlling the manipulator 14 to account for backdrive forces, it is conceivable that the one or more of the non-tool path components of the kinematic chain KC will experience an undesired orientational motion. Examples of the backdrive control of the robotic manipulator can be like that described in U.S. Pat. No. 10,327,849, entitled, "Robotic System and Method for Backdriving the Same," the disclosure of each of which is hereby incorporated by reference.

The one or more controllers 26, 68, 82 account for undesired orientational motion that is experienced by or will be experienced by the non-tool path components of the kinematic chain KC in response to backdriving of the manipulator 14. During the backdriving action (whether occurring intentionally or by collision), the energy applicator 24 is advanced along the tool path TP according to a first feed rate FR1. Reactive motion of the manipulator 14 pursuant to the backdrive command causes the undesired orientational motion UOM of the shaft 33 and joint J. The one or more controllers 26, 68, 82 change the feed rate from FR1 to FR2 to account for the undesired orientational motion UOM occurring responsive to the backdriving.

Another example of an external force/torque is one applied to the patient, or to the patient tracker(s) 54, 56, as shown at 134. When applied to the patient, external force/torque can occur due to repositioning the patient or occur because of a collision with the anatomy. For instance, the robotic manipulator or energy applicator 24 can collide with and push the patient anatomy. In other examples, the energy applicator 24 during manipulation of the anatomy can physically push the anatomy. In other instances, there may be an inadvertent bump to the anatomy by staff or other surgical instruments. When applied to the patient tracker(s) 54, 56, the external force/torque can occur because of many of the same reasons. Here, one or more of the patient tracker(s) 54, 56 moves from its current position to a different position in response to the external force/torque. External force/torque applied to the patient tracker(s) 54, 56 can be due to movement of the patient's anatomy. External force/torque can cause movement of the patient tracker(s) 54, 56 relative to the bone/anatomy to which the patient tracker(s) 54, 56 are attached. In other words, rigid fixation of the patient tracker(s) 54, 56 to the anatomy can become dislodged, shifted, or loosened. In any of these scenarios, the patient tracker(s) 54, 56 is likely to move and this can influence operation of the manipulator 14. In one instance, movement of the patient tracker(s) 54, 56 causes a corresponding movement of a virtual boundary 71 that is registered to the corresponding anatomy to which the patient tracker(s) 54, 56 is affixed. Movement of the virtual boundary 71 can collide with the manipulator 14 or energy applicator 24. Such scenarios can cause a "runaway" error condition in which the manipulator 14, constrained by a patient virtual boundary 71, continues to push the patient due to reactive force applied to the tool by the boundary 71. However, in response to such pushing, the same boundary 71 is moved due to its registration with the (now) moving anatomy. This runaway condition can be resisted, complied with, or avoided by adjusting the manipulator 14 operation (e.g., orientation, feed rate, commanded position, etc.). To mitigate this condition, the constraints to which the manipulator 14 is controlled can be adjusted. One example of a control system that can be used by the techniques described herein to mitigate runaway conditions can be like that described in International Patent Application No. PCT/US2020/053803, filed Jan. 10, 2020, and entitled "Surgical Systems and Methods for Guiding Robotic Manipulators", the entire disclosure of which is incorporated by reference. In another instance, movement of the patient tracker(s) 54, 56 from external force/torque can cause a regeneration/updating of a different trajectory, tool path TP or segments thereof. The operation of the manipulator 14 can be adjusted to accommodate the new tool path TP or trajectory.

In the process of controlling the manipulator 14 to account for external forces applied to the patient and/or the patient tracker(s) 54, 56, or in mitigating the "runaway" condition, it is conceivable that the one or more of the non-tool path components of the kinematic chain KC will experience an undesired orientational motion. The one or more controllers 26, 68, 82 account for undesired orientational motion that is experienced by or will be experienced by the non-tool path components of the kinematic chain KC in response to these external forces/torques. During the corrective action (whether occurring intentionally or by collision), the energy applicator 24 is advanced along the tool path TP according to a first feed rate FR1. Reactive motion of the manipulator 14 responsive to the corrective action causes the undesired orientational motion UOM of any of the non-tool path components. The one or more controllers 26, 68, 82 change the feed rate from FR1 to FR2 to account for the undesired orientational motion UOM occurring responsive to the corrective action.

D. Example Algorithm for Accounting for Undesired Orientational Motion

Figure 19:
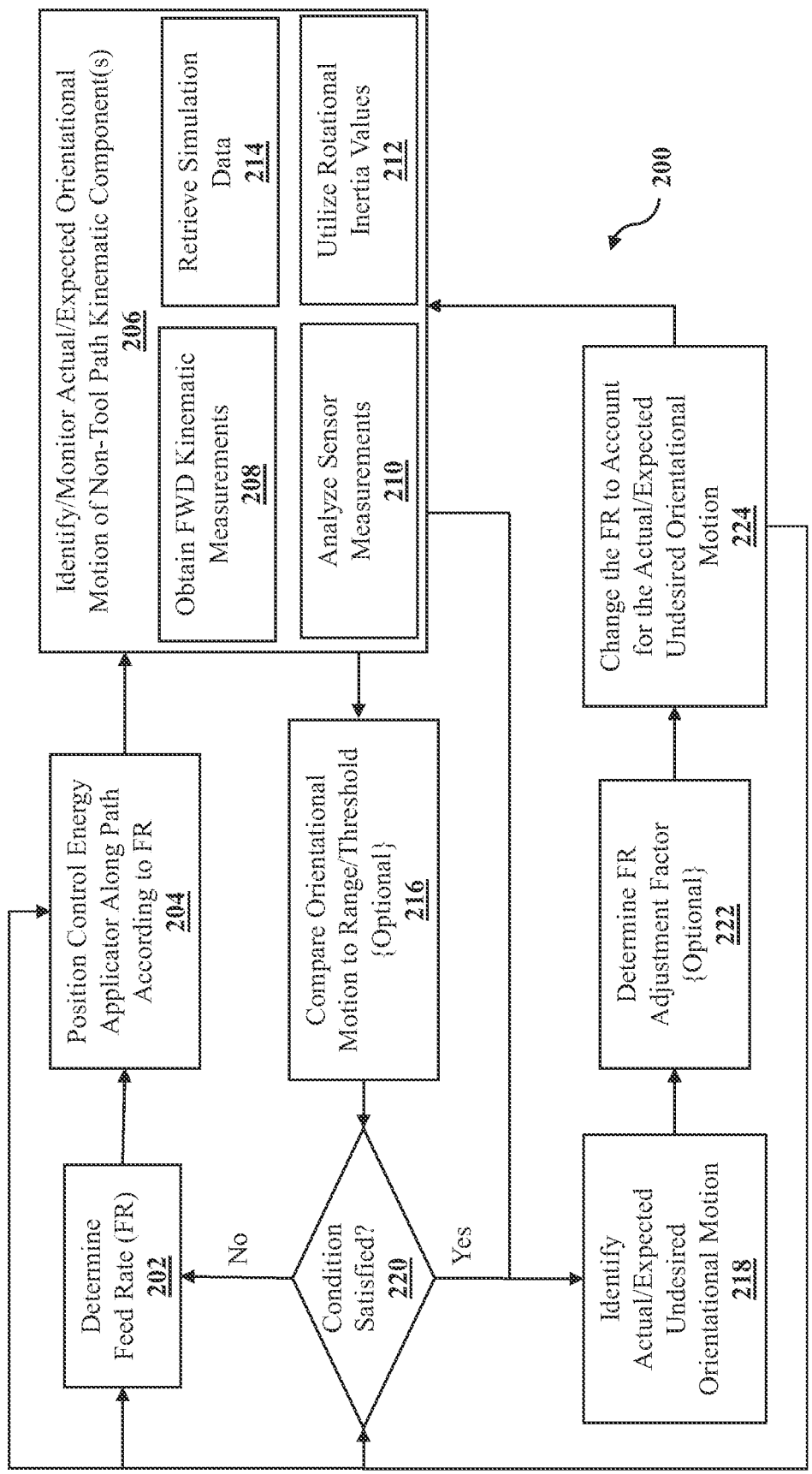
FIG. 19 is a flow chart illustrating one implementation of an algorithm utilized by the robotic surgical system to change the feed rate of the energy applicator to account for present or expected undesired orientational motion.

With reference to FIG. 19, one implementation of a method 200 for accounting for undesired orientational motion is described. The method 200 describes an algorithm implemented by the one or more controllers 26, 68, 82 and any supplemental components of the robotic surgical system, as will be described. The method 200 shown in FIG. 19 is not limited in scope because steps can be added or omitted and, when present, can be executed in order different from what is shown.

In one implementation, the method 200 begins at step 202, wherein the feed rate FR is determined. The feed rate FR can be determined by the feed rate calculator 82 according to the techniques and variables described in the previous section, and as shown in FIG. 8. This feed rate FR is the velocity at which the energy applicator 24 will be commanded to move. Accordingly, at step 204, the one or more controllers 26, 68, 82 command the manipulator 14 to advance the energy applicator 24 according to the feed rate FR. Such advancement is a position-controlled advancement of the energy applicator 24, e.g., such as along the tool path TP in the semi-autonomous mode. Orientational and positional control of the other components of the kinematic chain KC can occur at step 204 as well in order to enable the energy applicator 24 to move to the commanded positions while respecting other constraints of the system.

At step 206, the one or more controllers 26, 68, 82 identify, analyze and/or monitor undesired orientational motion of non-tool path kinematic component(s) of the kinematic chain KC. Here, the one or more controllers 26, 68, 82 can identify undesired orientational motion that is actively occurring (Actual UOM) or anticipated to occur (expected UOM). For either case, the one or more controllers 26, 68, 82 can employ any one or more of the following components, techniques, or algorithms to identify actual or expected undesired orientational motion. Any of the following can be utilized individually, or in combination. Identification of actual or expected undesired orientational motion can be in response to any of the factors, events, or conditions that influence presence of actual or expected undesired orientational motion, shown in FIG. 14 and described above.

At step 208, the one or more controllers 26, 68, 82 can optionally employ forward (FWD) kinematic measurements of the manipulator 14 to identify, analyze and/or monitor undesired orientational motion. Here, the one or more controllers 26, 68, 82 implement a kinematics process which computes a Cartesian endpoint position of the TCP a function of joint J angles. The forward kinematics process receives input from position sensors (encoders) in the joints J of manipulator 14. Based on this input, the forward kinematics process computes a position of the TCP relative to the base 16. Based on a known geometric relationship between the tool 20 and the energy applicator 24, a position of the energy applicator 24 relative to the base 16 can then be computed. Because the position sensors monitor joint position, the transformation can periodically update to reflect motion of the manipulator 14. The forward kinematics computation can be updated after any given time step of commanded motion of the energy applicator 24 performed according to inverse kinematic control. In the process of the forward kinematics computation, the one or more controllers 26, 68, 82 can store in non-transitory memory 64 the forward kinematic parameter values for various positions of the energy applicator 24. The energy applicator 24 can be advanced according to the feed rate FR when forward kinematics data is being captured. The one or more controllers 26, 68, 82 can analyze the forward kinematic parameter values over a duration of time to identify conditions, patterns, or trends which can be compared to ranges, thresholds, or conditions otherwise indicative of undesired orientational motion, as will be described at a later step 216. The one or more controllers 26, 68, 82 can also analyze the forward kinematic data to identify collisions that occur between the kinematic components and other objects, such as environmental objects or other kinematic components. With such techniques, the one or more controllers 26, 68, 82 can determine undesired orientational motion without the use of sensors or sensing systems other than joint encoders.

At step 210, the one or more controllers 26, 68, 82 can alternatively or additionally employ any given number of sensors or sensing systems to identify, analyze and/or monitor actual or expected undesired orientational motion. The one or more sensors are configured to generate measurements related to any one or more components of the kinematic chain KC, including the energy applicator 24. In one example, the one or more sensors or sensing system can be the navigation system 32 or any configuration thereof, such as an optical, electromagnetic, radio frequency, inertial, ultrasonic, or machine-vision based localization system which can track the kinematic components KC. The one or more sensors may comprise sensors coupled to any one or more of the joints J or links 18 which are configured to sense any one or more of a: joint or link position, joint or link velocity, and joint or link acceleration. Such sensors can be inertial sensors, tracking elements utilized with the navigation system 32, or the like. In another example, the one or more sensors may comprise current sensors configured to sense electrical current drawn by motors 27 of any one or more of the joints J. Such current sensing can be indicative of joint torque, from which the one or more controllers 26, 68, 82 can infer undesired orientational motion. It is contemplated to use sensors or sensing systems other than those specifically described above in order to identify undesired orientational motion. The one or more controllers 26, 68, 82 and/or the navigation system 32 are configured to analyze any of the above measurements, at given time periods or over any duration of time, to identify that one or more components of the kinematic chain KC other than the energy applicator 24 is either experiencing or will experience the undesired orientational motion.

At step 212, the one or more controllers 26, 68, 82 can alternatively or additionally employ inertial values to identify, analyze and/or monitor actual or expected undesired orientational motion. Specifically, the one or more controllers 26, 68, 82 are configured to store, in a non-transitory computer readable medium 64, inertia values for any one or more components of the kinematic chain KC, including the energy applicator 24. In one example, the inertial values are rotational inertial values. The rotational inertial values are also known as moment of inertia, mass moment of inertia, angular mass values. Such values define are a scalar quantity that determines torque required for a specified angular motion about a rotational axis. In another implementation, the inertial values can be translational or linear inertial vales. By having such values stored, the one or more controllers 26, 68, 82 are better equipped to identify whether one or more components of the kinematic chain KC other than the energy applicator 24 is either experiencing or will experience the undesired orientational motion.

At step 214, the one or more controllers 26, 68, 82 can alternatively or additionally utilize a simulation to identify, analyze and/or monitor actual or expected undesired orientational motion. Here, a pre-operative or intra-operative simulation can be performed to simulate motion of the manipulator 14 and respective kinematic components. Such simulated motion can be of advancement of the energy applicator 24, for example, along the tool path TP or optionally a simulation of advancement pursuant to the semi-autonomous mode. The control system 60 including the manipulator controller 26 and behavior controller 74 can simulate dynamics of the manipulator 14 in the virtual simulation described above or other simulation scheme using a physics engine to simulates rigid body dynamics of the base 16, links 18, joints J, end effector 22, tool 20 and/or energy applicator 24. The simulation can be the one utilized by the control system 60 to control the manipulator 14 in run-time or can be implemented separate therefrom. The simulation can be visually or graphically represented on a display or purely embodied by data that is hidden to the user. In one example, the simulation may perform movement of the manipulator 14 for all parts of the surgical procedure which are automated.

The simulation can consider any or all factors involved with control of the manipulator 14, including set-up or preferred pose, lead-in or lead-out path movements, retraction of the manipulator 14 from a site, reorientation of the manipulator 14, feed rate changes, constraints on the system, and the like. Additionally, the simulation can provide data related to other tasks, events or commands involved with the manipulator 14. For example, the simulation can comprise robotic data defining kinematic poses of any of the components of the manipulator 14 or a log or commanded data (e.g., commanded positions of the energy applicator 24). The simulation can comprise a log of collisions of any manipulator 14 components with one or more virtual boundaries 71, the magnitude/direction of the penetration of the boundary 71 collision, and/or parameters/values of the respective reactive force applied to correct the constraint collision. The simulation can obtain data related to any of the factors that could possibly or that do influence presence of undesired orientational motion, such as any of those described above and as shown in FIG. 14. Additionally, or alternatively, the simulation can be performed in part by the practitioner during a virtual trail-run of the procedure. Here, the practitioner may be able to visualize the manipulator 14 and surgical site in the simulation. Any of the above-described factors influencing presence of undesired orientational motion can be accounted for during this simulation. For example, there may be simulated external forces, constraints, collisions, backdrives, reorientations, etc., that occur as a result of external or practitioner-initiated factors, or as a result of automated robotic control.

In another implementation, the control system 60 may employ a machine learning algorithm which can be executed preoperatively or intraoperatively. The machine learning algorithm can analyze present robotic motion relative to past robotic and navigation system data to actively predict undesired orientational motion. Such predictions can be made for example, a few seconds or milliseconds before the expected undesired orientational motion. A neural network can be trained on prior robotic surgical procedures or simulations of similar nature to predict undesired orientational motion. Training data can also include patient data, implant data, procedure type, and/or surgeon preferences. For the current procedure, the trained neural network can be applied to automatically modify commands of the manipulator 14 (including adjustment of the feed rate) to account for predicted undesired orientational motions throughout the course of the procedure. A surgeon may be able to utilize an input device to visually review the impact of the machine learning predictions and respective modifications to the manipulator 14 motion prior to the procedure. The surgeon may also be able to accept or reject any predictive modifications to the manipulator 14 motion.

The outcome of the simulation or machine learning algorithm can include data including, among other things, a time log of predictive run-time events indicative of undesired orientational motion. Such data can be stored or transmitted to the control system 60. Prior to or during the procedure, the one or more controllers 26, 68, 82 are configured to retrieve the simulation or machine learning data from memory and identify, based on the simulation data and actual run-time data of the robotic system, that an undesired orientational motion is expected to occur. The control system 60 can then automatically modify motion of the manipulator 14 to either eliminate presence or reduce the expected effects of the upcoming undesired orientational motion. The simulation or machine learning techniques described herein can be implemented using any other type of sensing, as described above. Furthermore, it is contemplated that such simulation or machine learning can be performed according to manners not specifically described herein, for example, by using alternative forms of artificial intelligence and planning software. Examples of simulation techniques that can be employed are described in U.S. Patent Application Publication No. 2019/0142520A1, entitled "Patient-specific Preoperative Planning Simulation Techniques" the contents of which are hereby incorporated by reference in their entirety.

At step 216, the one or more controllers 26, 68, 82 optionally compare actual or predictive undesired orientational motion to a limit, threshold, or range. This function can be performed to delineate normal or desired orientational motion from undesired orientational motion. The limit, threshold or range can define sensitivity of the system 10 identification of undesired orientational motion. In practice, a balance in such sensitivity is beneficial for optimization of the procedure and user experience. If an excessive number of events are identified as undesired, the procedure time may be extended due to feed rate reduction. If too few events are identified as undesired, then the undesirable effects of orientational motion may comprise user experience or system accuracy. The practitioner may be able to adjust this sensitivity before, or during the procedure or during the simulation stage, if applicable. The threshold or range may define any one or more of: magnitude, direction, frequency, duration or excessive values of angular velocity, acceleration, or jerk for the kinematic components. Comparison to the thresholds or ranges can occur preoperatively, intraoperatively, during or in response to the simulation, or in response to identifying conditions indicative of future undesired orientational motion.

In one non-limiting example, evaluation of the actual or predictive orientational motion at step 216 can be performed as follows: defining a lower limit (e.g., in terms of angular velocity) below a certain value (e.g., 0.2 rad/s). If the actual or predictive orientational motion is below this lower limit, the one or more controllers 26, 68, 82 can regard such as negligible, normal and/or desirable and take no action to change the feed rate FR. If the actual or predictive orientational motion is at or above this lower limit (e.g., 0.2 rad/s) but at or below a first threshold (e.g., 0.4 rad/s), then the one or more controllers 26, 68, 82 can regard such as undesirable and take action to change the feed rate FR according to the techniques described herein. In one example, within the range between the lower limit and the first threshold, the feed rate FR can be changed by a mapping that corresponds to the value of the orientational motion. The mapping values relative to values related to orientational motion can be stored in a look-up table in memory. The mapping can be continuous or discrete and can be defined according to a linear function, a step function, an exponential function, a logarithmic, a customized (smooth) function, or any other type of function. For linear mapping, for example, the scaling can be 1 for orientational motion values at the lower limit (scaling by 1 to maintain existing/original/last feed rate) and 0 for orientational motion values at the first threshold (scaling by 0 to reduce FR to 0). At or between the lower limit and the first threshold, there can be linear correlation between the orientational motion values and the feed rate (e.g., scaling by 0.5 midway between the lower limit and first threshold to reduce existing FR by half). For actual or predictive undesired orientational motion values above the first threshold, the feed rate FR can be changed to either immediately reduce or zero-out the value of the actual or predictive undesired orientational motion. In other words, the one or more controllers 26, 68, 82 can regard such as zero-tolerance undesired orientational motion.

Additionally, or alternatively, the user may set or adjust any of these limits, thresholds, ranges, or scaling values based on preference or surgical plan using, e.g., the clinical application. For example, scaling (0 to 1) or limits can be reduced to 50% or more and increased to 150% or more of default values. The limits and threshold example described above is one of many different configurations contemplated. The ranges and values can be different from that described and this example.

Limits, thresholds or ranges and scaling/mapping can be specific to the condition or event causing the actual or predictive undesired orientational motion and can be separately defined for various conditions or events (e.g., any such events/conditions in FIG. 14). The limits, thresholds and ranges need not be specifically for values of the orientational motion (e.g., angular velocity), but can be values from other parameters/measurements which can be indirectly/directly correlated with actual or predictive orientational motion. For example, for actual or predictive undesired orientational motion occurring in response to collisions with the virtual boundary 71 (120, FIG. 14), the thresholds or ranges and scaling/mapping can depend on the value of the penetration parameter. For instance, if the penetration value is less than 0.1 mm, then scaling of the feed rate FR can be 0. If the penetration value is at or greater than 0.1 mm but less than 0.2 mm, then scaling of the feed rate FR can be between 0 and 1. If the penetration value is greater than 0.2 mm, the scaling of the feed rate FR can be 0. Again, these thresholds and scaling values are for example only and can be different than described depending on the condition/event and desired response.

At step 220, the one or more controllers 26, 68, 82 determine whether a condition occurs satisfying presence of actual or expected undesired orientational motion. Satisfaction of the condition occurs in response to satisfaction of the threshold or range at step 216. Satisfaction of the condition can occur at any time. In one example, satisfaction of the condition can be identified at the time of the commanded position of the energy applicator 24. In such instances, the condition can be satisfied in real-time or near real-time based on raw kinematic or localizer 44 values and without any filtering. Alternatively, the satisfaction of the condition can be identified based on filtered robotic or localizer 44 values where data can be filtered over a duration of time (e.g., 50-150 ms). The actual or expected undesired orientational motion can be computed/measured based on this filtered data. If the satisfaction of the condition does not occur, the one or more controllers 26, 68, 82 can maintain or resume the feed rate FR at step 202.

At step 218, the one or more controllers 26, 68, 82 identify presence of actual or expected undesired orientational motion. Again, identification of the undesired orientational motion can occur at any time. Identification may be, but need not necessarily be, in response to satisfaction of the threshold or range at step 220. Alternatively, automatic identification can occur based on analysis of any of the factors described above, such as identification of external forces, constraints, reorientation, or feed rate events (shown at FIG. 14) or based on analysis from identifying or monitoring actual/expected orientational motion of non-tool path kinematic component(s) from the sensors, sensing systems, inertial values, or simulation at step 206.

Having identified the undesired orientational motion, at step 222, the one or more controllers 26, 68, 82 have sufficiently evaluated the actual or expected undesired orientational motion and thereafter determine parameters of proper corrective action. The one or more controllers 26, 68, 82 determine how to change the feed rate FR to account for the undesired orientational motion. This can be performed according to any of the evaluation methods described at step 216, for example. In one implementation, detection of presence or expected presence of the above influencing factors or conditions (shown in FIG. 14) may be defined by variables and coefficients that can be used to quantify how to change the feed rate FR to account for undesired orientational motion. This can be performed in a manner similar to the techniques described in the previous sections used to calculate the feed rate based on the variables shown in FIG. 8. For example, each coefficient related to each applicable factor influencing undesired orientational motion can be between 0 and 1.0. The varying of the coefficient may be filtered or ramped to blend in/out the effect of the change in the magnitude of the coefficient. This filtering or blending can be done to result in a smooth mitigation of the undesired orientational motion. The effect of any variable may be selectively disregarded. For example, it may be desirable to determine change to the feed rate FR based on either the smallest or largest coefficient while the other coefficients are disregarded. Two or more variables into feed rate calculator 82 may be combined, e.g., by summing, multiplying, averaging, or dividing. The calculated coefficients may likewise be summed, multiplied, averaged, or divided to provide a final coefficient used to determine how to change the feed rate FR.

At step 224, the one or more controllers 26, 68, 82 carry out the change to the feed rate FR. This can be performed by changing the determined feed rate or overriding the determined feed rate. In practice, the feed rate FR often will be reduced to mitigate the negative effects of the undesired orientational motion. The feed rate FR modification can be reactive to occurrence of undesired orientational motion. Alternatively, the feed rate FR modification can be proactively implemented such that the non-tool path components of the kinematic chain KC do not experience (or fully experience) the expected undesired orientational motion since the system 10 will proactively mitigate the same. In some instances, the one or more controllers 26, 68, 82 can mitigate the undesired orientational motion by additionally, or alternatively, deliberately maintaining an existing/predetermined feed rate FR that was planned to increase. For example, the one or more controllers 26, 68, 82 may rapidly decrease, then increase, the feed rate FR to mitigate the undesired orientational motion. The feed rate FR can be reduced by a factor correlated to a magnitude and/or direction of the undesired orientational motion experienced by or that will be experienced. The change or reduction in feed rate may be gradual or impulsive and can occur over, or for, any duration, such as the duration determined by the one or more controllers 26, 68, 82 required to mitigate the undesired orientational motion. In any of these scenarios, the feed rate change can be carried out by transitioning to back to step 204, wherein the one or more controllers 26, 68, 82 command the manipulator 14 to advance the energy applicator 24 according to the feed rate FR that has been computed to account for the undesired orientational motion.

In response to change of the feed rate FR to account for the undesired orientational motion, the one or more controllers 26, 68, 82 can be configured to identify that the one or more components of the kinematic chain KC other than the energy applicator 24 is no longer experiencing or will no longer experience the undesired orientational motion. This identification can be performed by re-evaluation of whether the condition is satisfied at step 220 or by revaluation of the non-tool path components at step 206. Identification can also be implemented based on whether a threshold/limit or range is or is not satisfied, as described at steps 216, 220. For example, if the values compared for undesired orientational motion fall below the lower limit, the feed rate FR can be restored or resumed to last/previous/default/original value. In other examples, instead of utilizing values stored in look-up tables, the one or more controllers 26, 68, 82 can carry out a control loop, such as a PID control loop. For example, the set-point can be an acceptable value for orientational motion, such as a number at or below a lower limit. The control loop can receive input of the sensed values of actual orientational motion from any of the techniques described above. Through the control loop, the one or more controllers 26, 68, 82 can calculate the error as a difference between the set-point and actual values of orientational motion and then apply a correction to gain terms (e.g., P, I, D) to minimize the error until the sensed value of actual orientational motion satisfies the set-point. This is one example of a control loop that can be utilized to identify that one or more non-tool path components is no longer experiencing or will no longer experience the undesired orientational motion. Other types of control loops are contemplated. The one or more controllers 26, 68, 82 can also know expected durations of undesired orientational motion based on predictive analysis or simulation and infer that the duration during which undesired orientational motion occurs/would have occurred has elapsed. In response to any of these scenarios, the one or more controllers 26, 68, 82 can restore or resume the feed rate at 202 existing before or planned after change of the feed rate on account of undesired orientational motion.

IV. Other Examples for Accounting for Undesired Orientational Motion

The above-described techniques focus on modifying the feed rate to account for undesired orientational motion. Any of the techniques described above can be utilized by the one or more controllers 26, 68, 82 to mitigate undesired orientational motion by changing behavior of the manipulator 14 other than by changing the feed rate FR. For example, the one or more controllers 26, 68, 82 can predictively or dynamically manipulate joint J motion, limits, or poses, e.g., within the null-space; change the trajectory of the tool 20; modify the tool path TP; adjust virtual boundaries 71 or other constraints; prohibit robotic functions, such as tool or arm reorientation, arm backdrive, or feed rate adjustment by the user, or the like.

Several embodiments have been described in the foregoing description. The embodiments discussed herein are not intended to be exhaustive or limit to any particular form. The terminology, which has been used, is intended to be in the nature of words of description rather than of limitation. Many modifications and variations are possible in light of the above teachings and the invention may be practiced otherwise than as specifically described. Furthermore, the headings used in this document are introduced solely for reference and readability purposes and should not be understood to limit the content of the section solely by the subject matter of the heading.

What is claimed is:
1. A surgical system comprising:
    a surgical tool including an energy applicator;
    a manipulator comprising a base and a plurality of links and joints and the manipulator being configured to support the surgical tool, and wherein a kinematic chain is defined by components comprising the base and plurality of links and joints of the manipulator and the surgical tool including the energy applicator; and at least one controller configured to:
determine a feed rate defined as a velocity at which the energy applicator advances along a tool path in a semi-autonomous mode;
control the manipulator in the semi-autonomous mode to advance the energy applicator to a plurality of commanded positions along the tool path according to the feed rate;
identify that one or more components of the kinematic chain other than the energy applicator is either experiencing or will experience an undesired orientational motion that occurs during advancement of the energy applicator along the tool path according to the feed rate; and
change the feed rate to account for the undesired orientational motion.

2. The surgical system of claim 1, wherein the at least one controller changes the feed rate to account for the undesired orientational motion by further being configured to reduce the feed rate by a factor correlated to a magnitude of the undesired orientational motion experienced by or that will be experienced by the one or more components of the kinematic chain other than the energy applicator, and wherein the changed feed rate is a non-zero velocity that is less than the velocity of the feed rate existing before change of the feed rate.

3. The surgical system of claim 1, wherein the at least one controller identifies that one or more components of the kinematic chain other than the energy applicator is either experiencing or will experience the undesired orientational motion by further being configured to:
compare the undesired orientational motion to a threshold or range; and
change the feed rate to account for the undesired orientational motion in response to the undesired orientational motion satisfying the threshold or range.

4. The surgical system of claim 1, wherein the at least one controller is configured to:
obtain forward kinematic measurements of the kinematic chain during advancement of the energy applicator to the plurality of commanded positions along the tool path according to the feed rate; and
evaluate the forward kinematic measurements to identify that one or more components of the kinematic chain other than the energy applicator is either experiencing or will experience the undesired orientational motion.

5. The surgical system of claim 1, further comprising a non-transitory computer readable medium having stored thereon simulation data indicative of the undesired orientational motion of the one or more components of the kinematic chain, wherein the simulation data is obtained from a pre-operative simulation configured to simulate control of the manipulator in the semi-autonomous mode to advance the energy applicator to the plurality of commanded positions along the tool path according to the feed rate, and wherein the at least one controller is configured to:
retrieve the simulation data from the non-transitory computer readable medium; and
identify, based on the simulation data, that one or more components of the kinematic chain other than the energy applicator is either experiencing or will experience the undesired orientational motion.

6. The surgical system of claim 1, further comprising one or more sensors configured to generate measurements related to any one or more components of the kinematic chain; and
wherein the at least one controller is configured to analyze the measurements to identify that one or more components of the kinematic chain other than the energy applicator is either experiencing or will experience the undesired orientational motion.

7. The surgical system of claim 1, wherein the at least one controller is configured to:
store, in a non-transitory computer readable medium, inertia values for any one or more components of the kinematic chain; and
utilize the inertia values to identify that one or more components of the kinematic chain other than the energy applicator is either experiencing or will experience the undesired orientational motion.

8. The surgical system of claim 1, wherein during advancement of the energy applicator along the tool path in the semi-autonomous mode, the at least one controller is further configured to:
enable reorientation of the surgical tool;
identify that the one or more components of the kinematic chain other than the energy applicator is either experiencing or will experience the undesired orientational motion that further occurs responsive to reorientation of the surgical tool; and
change the feed rate to account for the undesired orientational motion that further occurs responsive to reorientation of the surgical tool.

9. The surgical system of claim 1, wherein the at least one controller is configured to:
associate one or more virtual haptic objects relative to the one or more components of the kinematic chain;
define a virtual boundary;
detect a collision between the one or more virtual haptic objects and the virtual boundary;
control the manipulator to constrain the one or more components of the kinematic chain having the virtual haptic object associated therewith from exceeding the virtual boundary in response to detection of the collision;
identify that the one or more components of the kinematic chain other than the energy applicator is either experiencing or will experience the undesired orientational motion that further occurs responsive to constrain of the one or more components of the kinematic chain in response to the detection of the collision; and
change the feed rate to account for the undesired orientational motion that further occurs responsive to constrain the one or more components of the kinematic chain in response to the detection of the collision.

10. The surgical system of claim 9, wherein the surgical tool comprises a shaft and the energy applicator at a distal end of the shaft, and the at least one controller is configured to:
associate the one or more of the virtual haptic objects relative to the shaft of the surgical tool at locations on the shaft other than at the distal end;
associate the virtual boundary relative to a surgical site with which the surgical tool interacts;
control the manipulator to constrain the shaft from exceeding the virtual boundary in response to detection of the collision between the one or more virtual haptic objects of the shaft and the virtual boundary of the surgical site;

identify that the shaft is either experiencing or will experience the undesired orientational motion; and change the feed rate to account for the undesired orientational motion experienced by or that will be experienced by the shaft.

11. The surgical system of claim 10, wherein the at least one controller is configured to:

evaluate a value of penetration that occurs between the one or more virtual haptic objects and the virtual boundary of the surgical site; and change the feed rate depending on evaluation of the value of penetration.

12. The surgical system of claim 1, wherein in response to change of the feed rate to account for the undesired orientational motion, the at least one controller is configured to:

identify that the one or more components of the kinematic chain other than the energy applicator is no longer experiencing or will no longer experience the undesired orientational motion, and in response, resume the feed rate planned after change of the feed rate.

13. The surgical system of claim 1, wherein the undesired orientational motion is further defined as undesired one or more of an: angular velocity, angular acceleration, or angular jerk experienced by or that will be experienced by any one or more components of the kinematic chain other than the energy applicator.

14. A method of operating a surgical system comprising a surgical tool including an energy applicator, a manipulator comprising a base and a plurality of links and joints and the manipulator supporting the surgical tool, and wherein a kinematic chain is defined by components comprising the base and plurality of links and joints of the manipulator and the surgical tool including the energy applicator, and at least one controller for:

determining a feed rate defined as a velocity at which the energy applicator advances along a tool path in a semi-autonomous mode;

controlling the manipulator in the semi-autonomous mode for advancing the energy applicator to a plurality of commanded positions along the tool path according to the feed rate;

identifying that one or more components of the kinematic chain other than the energy applicator is either experiencing or will experience an undesired orientational motion occurring during advancement of the energy applicator along the tool path according to the feed rate; and changing the feed rate to account for the undesired orientational motion.

15. The method of claim 14, wherein changing the feed rate to account for the undesired orientational motion comprises the at least one controller reducing the feed rate by a factor correlated to a magnitude of the undesired orientational motion experienced by or that will be experienced by the one or more components of the kinematic chain other than the energy applicator, and wherein the changed feed rate is a non-zero velocity that is less than the velocity of the feed rate that existed before changing the feed rate.

16. The method of claim 14, wherein identifying that one or more components of the kinematic chain other than the energy applicator is either experiencing or will experience the undesired orientational motion comprises the at least one controller:

comparing the undesired orientational motion to a threshold or range; and changing the feed rate to account for the undesired orientational motion in response to the undesired orientational motion satisfying the threshold or range.

17. The method of claim 14, comprising the at least one controller:

obtaining forward kinematic measurements of the kinematic chain during advancing of the energy applicator to the plurality of commanded positions along the tool path according to the feed rate; and evaluating the forward kinematic measurements for identifying that one or more components of the kinematic chain other than the energy applicator is either experiencing or will experience the undesired orientational motion.

18. The method of claim 14, comprising a non-transitory computer readable medium having stored thereon simulation data indicative of the undesired orientational motion of the one or more components of the kinematic chain, wherein the simulation data is obtained from a pre-operative simulation for simulating control of the manipulator in the semi-autonomous mode to advance the energy applicator to the plurality of commanded positions along the tool path according to the feed rate, and comprising the at least one controller:

retrieving the simulation data from the non-transitory computer readable medium; and identifying, based on the simulation data, that one or more components of the kinematic chain other than the energy applicator is either experiencing or will experience the undesired orientational motion.

19. The method of claim 14, further comprising one or more sensors generating measurements related to any one or more components of the kinematic chain, and comprising the at least one controller:

analyzing the measurements to identify that one or more components of the kinematic chain other than the energy applicator is either experiencing or will experience the undesired orientational motion.

20. The method of claim 14, comprising the at least one controller:

storing, in a non-transitory computer readable medium, inertia values for any one or more components of the kinematic chain; and utilizing the inertia values for identifying that one or more components of the kinematic chain other than the energy applicator is either experiencing or will experience the undesired orientational motion.

21. The method of claim 14, comprising the at least one controller, during advancement of the energy applicator along the tool path in the semi-autonomous mode:

enabling reorientation of the surgical tool;

identifying that the one or more components of the kinematic chain other than the energy applicator is either experiencing or will experience the undesired orientational motion further occurring responsive to reorientation of the surgical tool; and changing the feed rate to account for the undesired orientational motion further occurring responsive to reorientation of the surgical tool.

22. The method of claim 14, comprising the at least one controller:

associating one or more virtual haptic objects relative to the one or more components of the kinematic chain;

defining a virtual boundary;

detecting a collision between the one or more virtual haptic objects and the virtual boundary;

controlling the manipulator for constraining the one or more components of the kinematic chain having the virtual haptic object associated therewith from exceeding the virtual boundary in response to detecting the collision;

identifying that the one or more components of the kinematic chain other than the energy applicator is either experiencing or will experience the undesired orientational motion further occurring responsive to the manipulator constraining the one or more components of the kinematic chain in response to the detecting the collision; and changing the feed rate to account for the undesired orientational motion further occurring responsive to the manipulator constraining the one or more components of the kinematic chain in response to the detecting the collision.

23. The method of claim 22, wherein the surgical tool comprises a shaft and the energy applicator at a distal end of the shaft, and comprising the at least one controller:

associating the one or more of the virtual haptic objects relative to the shaft of the surgical tool at locations on the shaft other than at the distal end;

associating the virtual boundary relative to a surgical site with which the surgical tool interacts;

controlling the manipulator for constraining the shaft from exceeding the virtual boundary in response to detecting the collision between the one or more virtual haptic objects of the shaft and the virtual boundary of the surgical site;

identifying that the shaft is either experiencing or will experience the undesired orientational motion; and changing the feed rate to account for the undesired orientational motion experienced by or that will be experienced by the shaft.

24. The method of claim 23, comprising the at least one controller:

evaluating a value of penetration occurring between the one or more virtual haptic objects and the virtual boundary of the surgical site; and changing the feed rate depending on evaluating of the value of penetration.

25. The method of claim 14, comprising the at least one controller, after changing of the feed rate to account for the undesired orientational motion:

identifying that the one or more components of the kinematic chain other than the energy applicator is no longer experiencing or will no longer experience the undesired orientational motion, and in response, resuming the feed rate planned after changing the feed rate.

* * * * *